US012294657B2

(12) United States Patent
Cao et al.

(10) Patent No.: US 12,294,657 B2
(45) Date of Patent: May 6, 2025

(54) SOFTWARE INTEGRITY PROTECTION METHOD AND APPARATUS, AND SOFTWARE INTEGRITY VERIFICATION METHOD AND APPARATUS

(71) Applicant: HUAWEI TECHNOLOGIES CO., LTD., Guangdong (CN)

(72) Inventors: Bin Cao, Nanjing (CN); Haiwu Chen, Beijing (CN); Yan Chen, Nanjing (CN); Bo Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 268 days.

(21) Appl. No.: 17/711,879

(22) Filed: Apr. 1, 2022

(65) Prior Publication Data
US 2022/0224546 A1 Jul. 14, 2022

Related U.S. Application Data

(63) Continuation of application No. PCT/CN2020/122503, filed on Oct. 21, 2020.

(30) Foreign Application Priority Data

Oct. 23, 2019 (CN) .......................... 201911012940.1
Nov. 15, 2019 (CN) .......................... 201911120987.X

(51) Int. Cl.
*H04L 9/32* (2006.01)
*H04L 9/00* (2022.01)
(52) U.S. Cl.
CPC ............ *H04L 9/3247* (2013.01); *H04L 9/006* (2013.01); *H04L 9/3263* (2013.01)

(58) Field of Classification Search
CPC ..... H04L 9/3247; H04L 9/006; H04L 9/3263; G06F 21/12; G06F 8/61; G06F 21/57;
(Continued)

(56) References Cited

U.S. PATENT DOCUMENTS

2006/0064488 A1 3/2006 Ebert
2010/0180123 A1* 7/2010 Kopetz ................. H04L 9/3249
713/168

(Continued)

FOREIGN PATENT DOCUMENTS

CN 103873238 A 6/2014
CN 110110507 A 8/2019
(Continued)

*Primary Examiner* — Jacob Lipman

(57) ABSTRACT

Embodiments of this application disclose a software integrity protection method and apparatus. A first device obtains a first software package, where the first software package includes a first signature made by a first party for a second software package by using a first private key; and the first device performs a signing operation on the first software package by using a second private key, to obtain a third software package including a second signature, where the first private key is controlled by the first party, and the second private key is controlled by a second party. The first device sends the third software package to a second device. The second device verifies the first signature and the second signature in the third software package respectively based on a first public key and a second public key that are prestored, to obtain a verification result.

10 Claims, 12 Drawing Sheets

(58) Field of Classification Search
CPC .......... G06F 21/575; G06F 21/64; G06F 8/63;
G06F 21/602
USPC ........................................................ 713/170
See application file for complete search history.

(56) References Cited

U.S. PATENT DOCUMENTS

| | | | |
|---|---|---|---|
| 2012/0069992 A1* | 3/2012 | Jozwiak | G06F 21/16 380/28 |
| 2014/0032915 A1 | 1/2014 | Muzammil et al. | |
| 2017/0230185 A1 | 8/2017 | Varadhan et al. | |
| 2017/0286665 A1* | 10/2017 | Miranda | H04L 63/0823 |
| 2018/0139060 A1* | 5/2018 | Lin | H04L 9/3226 |
| 2018/0367315 A1* | 12/2018 | Chen | H04L 9/3247 |

FOREIGN PATENT DOCUMENTS

| | | |
|---|---|---|
| CN | 110245466 A | 9/2019 |
| JP | 2001356833 A | 12/2001 |
| KR | 20130093847 A | 8/2013 |

\* cited by examiner

SOFTWARE INTEGRITY PROTECTION METHOD AND APPARATUS, AND SOFTWARE INTEGRITY VERIFICATION METHOD AND APPARATUS

CROSS-REFERENCE TO RELATED APPLICATIONS

This application is a continuation of International Application No. PCT/CN2020/122503, filed on Oct. 21, 2020, which claims priority to Chinese Patent Application No. 201911012940.1, filed on Oct. 23, 2019 and Chinese Patent Application No. 201911120987.X, filed on Nov. 15, 2019. All of the aforementioned patent applications are hereby incorporated by reference in their entireties.

TECHNICAL FIELD

This application relates to the field of security technologies, and in particular, to a software integrity protection method and apparatus, and a software integrity verification method and apparatus.

BACKGROUND

Usually, to ensure software integrity of a software package, software integrity protection and verification may be performed on the software package, which specifically includes: Before the software package is downloaded to a device, the software package is signed by using a private key provided by a software manufacturer. Before loading the software package, the device verifies a signature of the software package by using a public key corresponding to the private key. If the signature verification succeeds, it indicates that the software package is not maliciously tampered with by an attacker and can be loaded.

Currently, a software package is signed and signature verification is performed on the software package by using only keys provided by a software manufacturer, to ensure software integrity of the software package loaded on a device. Consequently, a trust issue cannot be resolved for a user.

SUMMARY

In view of this, embodiments of this application provide a software integrity protection method and apparatus, and a software integrity verification method and apparatus, to provide software integrity protection and verification manners that are trusted by a user, thereby improving user experience of using a device.

According to a first aspect, a software integrity protection method is provided. The method is used to perform software integrity protection on a second software package that is to be downloaded to and installed in a second network device. The method may specifically include: Step 1: A first device obtains a first software package that is obtained after a first party performs a signing operation on a second software package by using a first private key, where the first software package includes the second software package and a first signature. Step 2: The first device performs a signing operation on the first software package by using a second private key, to obtain a third software package including a second signature, where the first private key is controlled by the first party, and the second private key is controlled by a second party.

In an example, the first device may be a manufacturer signature system corresponding to a software manufacturer. In this case, the first party may be a user of the second software package, and the second party is a manufacturer of the second software package or a third-party digital certificate authority. Step 1 may be specifically: After obtaining the second software package, a user signature system performs a signing operation on the second software package by using the first private key provided by the user signature system, to obtain the first signature, and sends the first software package including the first signature and the second software package to the first device.

In another example, the first device may alternatively be a user signature system. In this case, the first party may be a manufacturer of the second software package or a third-party digital certificate authority, and the second party is a user of the second software package. Step 1 may be specifically: After obtaining the second software package, a manufacturer signature system performs a signing operation on the second software package by using the first private key provided by the manufacturer signature system, to obtain the first signature, and sends the first software package including the first signature and the second software package to the first device.

In this way, according to the method provided in this embodiment of this application, not only the software package can be signed based on the key provided by the manufacturer, but also the software package can be signed based on the key provided by the user, and the key provided by the user is absolutely trustworthy to the user. That is, this embodiment of this application provides a software integrity protection manner that can be trusted by the user, without completely trusting or relying on the manufacturer. This resolves a trust issue for the user, thereby improving user experience of using a device.

In a possible implementation of the first aspect, the method may further include: The first device sends the third software package to the second device. In this way, a trustworthy and rich data basis is provided for the second device to perform, before the second device loads the second software package, software integrity verification on the second software package according to a software integrity verification method provided in the following second aspect.

In another possible implementation of the first aspect, a switching enable bit and a dual-root enable bit may be further configured on the second device, to configure a software integrity verification mechanism of the second device. When software integrity verification is performed on the second software package on the second device, in an example, when the switching enable bit on the second device is invalid and the dual-root enable bit on the second device is valid, the first signature and the second signature being both valid represent that the integrity verification on the second software package succeeds. In another example, when the switching enable bit on the second device is valid, the first signature being valid represents that the integrity verification on the second software package succeeds. In still another example, when the switching enable bit on the second device is invalid and the dual-root enable bit on the second device is invalid, the second signature being valid represents that the integrity verification on the second software package succeeds. If a value of the switching enable bit and a value of the dual-root enable bit on the second device are both valid, a priority of the switching enable bit may be further set to be higher than that of the dual-root enable bit. In this way, field segments of the two enable bits are reserved on the second device, so that when the user needs to use a dual signature verification mechanism or a user signature verification mechanism, the user may enable the corresponding signature verification mechanism by configuring the values of the two enable bits. This improves flexibility of software integrity verification on software on the second device, and improves user experience of using the second device.

In some other possible implementations of the first aspect, in a process of producing the second device, a manufacturer public key may be burnt in an SoC of the second device, and field segments of a user public key, the dual-root enable bit, and the switching enable bit are reserved. This facilitates enabling the dual signature verification mechanism or the user signature verification mechanism based on an actual requirement, packaging a value of the corresponding user public key, the value of the dual-root enable bit, and the value of the switching enable bit into one or more files (recorded as a burn file), and burning the values in the corresponding field segments during subsequent use of the second device by the user, to be prepared for software integrity verification provided in the following second aspect in an embodiment of this application. It may be understood that, the burn file may be stored in a boot root of trust of the second device, for example, a one-time programmable memory (OTP). The boot root of trust may be specifically an on-chip boot medium BootROM in the system on chip SoC of the second device.

In an example, to ensure that the burn file is trustworthy, before content in the burn file is stored, the second device further prestores an identifier of the second device and a dual signature verification device list. The identifier of the second device can uniquely identify the second device. The dual signature verification device list is a set of device identifiers that are recorded by the manufacturer and that are of devices authorized to enable the dual signature verification mechanism. The dual signature verification device list may be signed by using the manufacturer signature system and then delivered to the second device. When determining, through signature verification, that the dual signature verification device list is valid, the second device may determine whether the identifier of the second device belongs to the dual signature verification device list, and if the identifier of the second device belongs to the dual signature verification device list, may consider that the second device is a device authorized to enable the dual signature verification mechanism. In this case, after the burn file is received, configuration of the software integrity verification of the second device is completed in a field segment reserved for a retained value corresponding to the content in the burn file.

It may be understood that, to reduce a quantity of times that an original root private key is exposed, the first public key, the first private key, the second public key, and the second private key in this embodiment of this application may all be secondary keys obtained after an original root public key and the original root private key are processed.

It may be understood that, for a software package including multi-level firmware, each step in this embodiment of this application may use a same or different private key to perform a signing operation on each level of firmware, thereby improving security of software integrity protection on the software package. In addition, an entire software package including each level of signed firmware may be further signed, so that efficiency of performing software integrity verification on the software package by the second device can be improved to some extent.

According to the second aspect, an embodiment of this application further provides a software integrity verification method, applied to a second device. A third software package protected by using the method provided in the first aspect is downloaded to and installed in the second device. The method may specifically include: Step 1: The second device obtains a first software package, where the first software package includes a first signature, a second signature, and a second software package. Step 2: The second device verifies the first signature and the second signature respectively based on a first public key and a second public key that are prestored, to obtain a verification result, where the first public key is controlled by a first party, and the second public key is controlled by a second party.

It may be understood that, the first signature is obtained by performing a signing operation on the second software package by using a first private key controlled by the first party, the third software package includes the first signature and the second software package, the second signature is obtained by performing a signing operation on the third software package by using a second private key controlled by the second party, the first private key matches the first public key, and the second private key matches the second public key. The first party may be a user of the second software package, and the second party is a manufacturer of the second software package or a third-party digital certificate authority. Alternatively, the first party may be a manufacturer of the second software package or a third-party digital certificate authority, and the second party is a user of the second software package.

In this way, according to the method provided in this embodiment of this application, for a software package on which software integrity protection is performed by using keys provided by a manufacturer and a user, not only signature verification can be performed on the software package based on the key provided by the manufacturer, but also signature verification can be performed on the software package based on the key provided by the user, to provide a dual trustworthy basis for software integrity verification for the user, so that the software integrity verification is more trustworthy, and the user does not need to completely trust and rely on the manufacturer. This resolves a trust issue for the user, thereby improving user experience of using the device.

In a possible implementation of the second aspect, a switching enable bit and a dual-root enable bit may be further configured on the second device, to configure a software integrity verification mechanism of the second device. When software integrity verification is performed on the second software package on the second device, in an example, when the switching enable bit on the second device is invalid and the dual-root enable bit on the second device is valid, step 2 in the second aspect may specifically include: The second device verifies the first signature based on the prestored first public key, to obtain a first signature verification result, where the first signature verification result is used to represent whether the first signature is valid; the second device verifies the second signature based on the prestored second public key, to obtain a second signature verification result, where the second signature verification result is used to represent whether the second signature is valid; and the second device may generate the verification result based on the first signature verification result and the second signature verification result, where the verification result is used to represent whether the software integrity verification on the second software package succeeds, and when the first signature verification result represents that the first signature is valid and the second signature verification result represents that the second signature is valid, the verification result represents that the integrity verification on the second software package succeeds. In another example, when the switching enable bit on the second device is valid, step 2 in the second aspect may specifically further include: The second device verifies the first signature based on the prestored first public key, to obtain a first signature verification result, where the first signature verification result is used to represent whether the first signature is valid; and the second device may generate the verification result based on the first signature verification result, where the verification result is used to represent whether the software integrity verification on the second software package succeeds, and when the first signature verification result represents that the first signature is valid, the verification result represents that the integrity verification on the second software package succeeds. In still another example, when the switching enable bit on the first device is invalid and the dual-root enable bit on the first device is invalid, step 2 in the second aspect may specifically further include: The second device verifies the second signature based on the prestored second public key, to obtain a second signature verification result, where the second signature verification result is used to represent whether the second signature is valid; and the second device may generate the verification result based on the second signature verification result, where the verification result is used to represent whether the software integrity verification on the second software package succeeds, and when the second signature verification result represents that the second signature is valid, the verification result represents that the integrity verification on the second software package succeeds. In this way, values of the two enable bits are configured on the second device, and the user may enable a corresponding signature verification mechanism based on an actual requirement. This improves flexibility of software integrity verification on software on the second device, and improves user experience of using the second device.

In some other possible implementations of the second aspect, the second software package includes first firmware and second firmware.

In an example, when the first firmware is the first piece of software firmware that is loaded during a boot of the second device, this embodiment of this application may include: A boot root of trust in the second device obtains a second user public key from a first root certificate, where the second user public key is a trustworthy user root public key in the boot root of trust; verifies a third signature on the first firmware by using the second user public key, to obtain a fifth verification result, where the fifth verification result is used to represent software integrity of the first firmware, the third signature is a signature obtained after a signing operation is performed on the first firmware by using a second user private key, and the second user public key corresponds to the second user private key. In a case, when the switching enable bit on the second device is valid, the method further includes: when the fifth verification result represents that the third signature is valid, determining that the first firmware is valid and loading the first firmware. In another case, if the dual-root enable bit on the second device is valid, the method further includes: The boot root of trust in the second device obtains a second manufacturer public key from a second root certificate, where the second manufacturer public key is a trustworthy manufacturer root public key in the boot root of trust; verifies a fourth signature on the first firmware by using the second manufacturer public key, to obtain a sixth verification result, where the sixth verification result is used to represent software integrity of the first firmware at a manufacturer level; and when the fifth verification result represents that the third signature is valid and the sixth verification result represents that the fourth signature is valid, determines that the first firmware is valid and loads the first firmware.

In addition, verification on the first firmware may further include: The boot root of trust in the second device obtains the first firmware, and calculates a hash value of the first firmware; compares a hash value stored in the boot root of trust and the hash value of the first firmware, to obtain a first comparison result, where the first comparison result is used to represent the software integrity of the first firmware; and when the first comparison result represents that the hash value stored in the boot root of trust is consistent with the hash value of the first firmware, determines that the first firmware is valid and loads the first firmware.

In another example, when the first firmware is other software firmware (other firmware before the first piece of software firmware) that is loaded during a boot of the second device, and the second firmware is firmware that is verified and loaded after the first firmware is loaded, the method further includes: obtaining a first user public key from a first certificate in the first firmware; and verifying a first signature on the second firmware by using the first user public key, to obtain a first signature verification result, where the first signature verification result is used to represent software integrity of the second firmware, the first signature is a signature obtained after a signing operation is performed on the second firmware by using a first user private key, and the first user public key corresponds to the first user private key. In a case, if the switching enable bit on the second device is valid, when the first signature verification result represents that the first signature is valid, it is determined that the second firmware is valid and the second firmware is loaded. In another case, if the dual-root enable bit on the second device is valid, the method further includes: obtaining a second manufacturer public key from a second certificate in the first firmware; verifying a second signature on the second firmware by using a second manufacturer public key, to obtain a second verification result, where the second verification result is used to represent software integrity of the second firmware, the second signature is a signature obtained after a signing operation is performed on the second firmware by using a second manufacturer private key, and the second manufacturer public key corresponds to the second manufacturer private key; and when the first signature verification result represents that the first signature is valid and the second verification result represents that the second signature is valid, determining that the second firmware is valid and loading the second firmware. In this way, for other firmware than the first piece of software firmware, software integrity verification is performed by using the foregoing method until all firmware in the software package is loaded, or software integrity verification on a specific piece of firmware fails.

In some other possible implementations of the second aspect, if the first signature and the second signature are signatures obtained after signing operations are performed by using secondary private keys, and the first public key and the second public key that are prestored in the second device are also secondary public keys, before each signature is verified, this embodiment of this application may further include the following two steps: Step 1: Read an original root public key from a flash memory, calculate a hash value of the original root public key, verify whether the hash value is consistent with that of a primary public key, and if the hash value is consistent with that of the primary public key, determine that the primary public key is valid. Step 2: Read a certificate, perform signature verification on the certificate by using a secondary public key that is obtained by processing the primary public key, and if the signature verification succeeds, determine that a secondary public key prestored in the certificate is valid, and verify the software package by using the secondary public key. In this way, not only software integrity verification can be performed on the second software package to be loaded on the second device, but also a quantity of times that the original root private key is exposed can be reduced, thereby improving security and reliability of the second device. In addition, storage space on an SoC can also be saved.

In some other possible implementations of the second aspect, in this embodiment of this application, the second public key may alternatively be extracted from a code segment, and appended to a code segment 2 in a form of a single file 1, that is, before delivery of the second device, a layout in the flash memory may be represented, for example, as "header file+code segment 2+file 1". In this way, when a dual signature verification mechanism is enabled during use of the second device, only a file 2 needs to be separately added to the flash memory to store the first public key. In this case, a layout in the flash memory may be represented, for example, as "header file+code segment 2+file 1+file 2". In this way, work difficulty caused by a change in the signature verification mechanism for the user is greatly reduced, and user experience of using the second device is improved.

According to a third aspect, an embodiment of this application further provides a software integrity protection apparatus. The apparatus is used in a first device, and the apparatus includes an obtaining unit and a signing unit. The obtaining unit is configured to obtain a first software package, where the first software package includes a first signature made by a first party for a second software package by using a first private key. The signing unit is configured to perform a signing operation on the first software package by using a second private key, to obtain a third software package including a second signature, where the first private key is controlled by the first party, and the second private key is controlled by a second party.

The first party is a user of the second software package, and the second party is a manufacturer of the second software package or a third-party digital certificate authority.

In a possible implementation, the apparatus further includes a sending unit. The sending unit is configured to send a third software package to a second device.

In another possible implementation, when a switching enable bit on the second device is invalid and a dual-root enable bit on the second device is valid, the first signature and the second signature being both valid represent that integrity verification on the second software package succeeds; or when a switching enable bit on the second device is valid, the first signature being valid represents that integrity verification on the second software package succeeds; or when a switching enable bit on the second device is invalid and a dual-root enable bit on the second device is invalid, the second signature being valid represents that integrity verification on the second software package succeeds.

It should be noted that the apparatus provided in the third aspect is configured to perform the operations in the first aspect. For specific implementations and achieved effects of the apparatus, refer to related descriptions in the first aspect. Details are not described herein again.

According to a fourth aspect, an embodiment of this application further provides a software integrity verification apparatus. The apparatus is used in a second device, and the apparatus includes an obtaining unit and a verification unit. The obtaining unit is configured to obtain a first software package, where the first software package includes a first signature, a second signature, and a second software package. The verification unit is configured to verify the first signature and the second signature respectively based on a first public key and a second public key that are prestored, to obtain a verification result, where the first public key is controlled by a first party, and the second public key is controlled by a second party.

In a possible implementation, the first signature is obtained by performing a signing operation on the second software package by using a first private key controlled by the first party, the first signature and the second software package are included in a third software package, the second signature is obtained by performing a signing operation on the third software package by using a second private key controlled by the second party, the first private key matches the first public key, and the second private key matches the second public key.

The first party is a user of the second software package, and the second party is a manufacturer of the second software package or a third-party digital certificate authority.

In another possible implementation, when a switching enable bit on the second device is invalid and a dual-root enable bit on the second device is valid, the verification unit includes: a first verification subunit, configured to verify the first signature based on the prestored first public key, to obtain a first signature verification result, where the first signature verification result is used to represent whether the first signature is valid; a second verification subunit, configured to verify the second signature based on the prestored second public key, to obtain a second signature verification result, where the second signature verification result is used to represent whether the second signature is valid; and a first generation subunit, configured to generate the verification result based on the first signature verification result and the second signature verification result, where the verification result is used to represent whether software integrity verification on the second software package succeeds, and when the first signature verification result represents that the first signature is valid and the second signature verification result represents that the second signature is valid, the verification result represents that the integrity verification on the second software package succeeds. Alternatively, when a switching enable bit on the second device is valid, the verification unit includes: a third verification subunit, configured to verify the first signature based on the prestored first public key, to obtain a first signature verification result, where the first signature verification result is used to represent whether the first signature is valid; and a second generation subunit, configured to generate the verification result based on the first signature verification result, where the verification result is used to represent whether software integrity verification on the second software package succeeds, and when the first signature verification result represents that the first signature is valid, the verification result represents that the integrity verification on the second software package succeeds. Alternatively, when a switching enable bit on the second device is invalid and a dual-root enable bit on the first device is invalid, the verification unit includes: a fourth verification subunit, configured to verify the second signature based on the prestored second public key, to obtain a second signature verification result, where the second signature verification result is used to represent whether the second signature is valid; and a third generation subunit, configured to generate the verification result based on the second signature verification result, where the verification result is used to represent whether software integrity verification on the second software package succeeds, and when the second signature verification result represents that the second signature is valid, the verification result represents that the integrity verification on the second software package succeeds.

It should be noted that the apparatus provided in the fourth aspect is configured to perform the operations in the second aspect. For specific implementations and achieved effects of the apparatus, refer to related descriptions in the second aspect. Details are not described herein again.

According to a fifth aspect, an embodiment of this application further provides a device. The device includes a memory and a processor. The memory is configured to store program code. The processor is configured to run the program code or instructions in a program, to enable the device to perform the method in any one of the implementations of the first aspect or the second aspect.

According to a sixth aspect, an embodiment of this application further provides a computer-readable storage medium. The computer-readable storage medium stores program code or instructions. When the program code or the instructions are run on a computer, the computer is enabled to perform the method in any one of the implementations of the first aspect or the second aspect.

According to a seventh aspect, an embodiment of this application further provides a network system. The network system includes the software integrity protection provided in the third aspect and the software integrity verification apparatus provided in the fourth aspect.

In some embodiments, a first-party CA, for example, a server, may issue a digital certificate to a software package. A second-party or third-party CA may also be a server configured to issue a digital certificate.

BRIEF DESCRIPTION OF DRAWINGS

To describe technical solutions of embodiments of this application more clearly, the following briefly describes the accompanying drawings for describing the embodiments. It is clear that the accompanying drawings in the following descriptions show merely some embodiments of this application, and a person of ordinary skill in the art may derive other drawings from these accompanying drawings.

DESCRIPTION OF EMBODIMENTS

Figure 1:
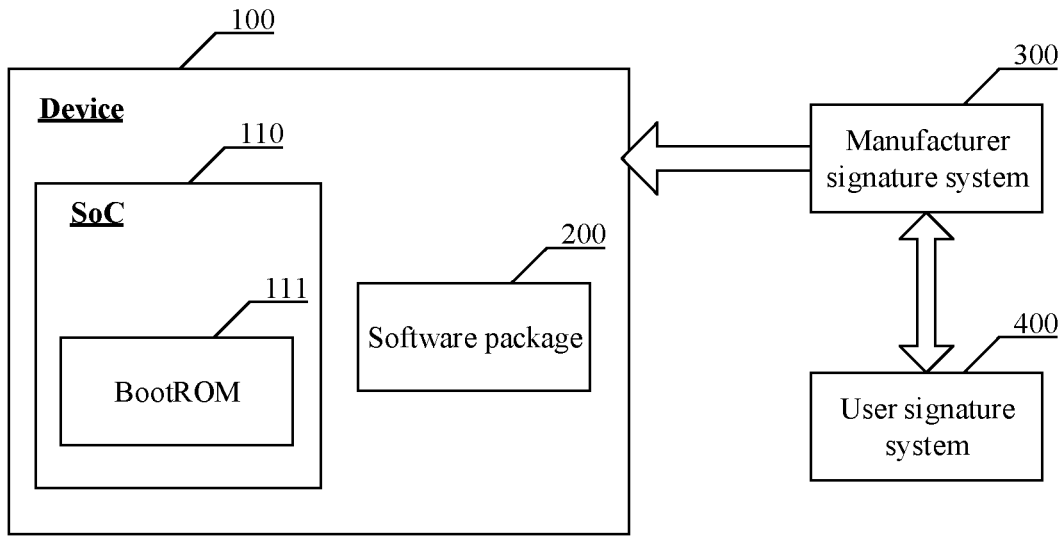
FIG. 1 is a schematic diagram of a network system framework in an application scenario according to an embodiment of this application.

A digital signature usually includes a pair of keys, one used to sign a digital digest of a software package, a message, or the like, and the other used to verify the signature of the software package, the message, or the like. In an example, it is assumed that a digital signature process for a software package X may include the following two processes: The first process corresponds to signing a digital digest of the software package X. To be specific, before the software package X is downloaded to a device Y, a digital digest X1 of X is first obtained by using a hash algorithm, and then digestEncode X1 is obtained by signing the digest X1 by using a private key a. When the software package X is downloaded to the device Y, X and digestEncode X1 are sent to the device Y. The second process corresponds to verifying the signature of the software package X. To be specific, before loading the software package X, the device Y may first generate a digital digest digest X2 by using a hash algorithm that is the same as that used for signing X, and then verify digestEncode X1 by using a public key A, to obtain digestDecode X3, and if digestDecode X3=digest X2, may determine that the software package X is not tampered with and is released by a legal manufacturer. Therefore, it is ensured that the software package X loaded on the device Y is secure and reliable. The private key a and the public key A are a pair of keys provided by a manufacturer of a device A. The public key A is publicly accessible, and the private key a is confidential, and is accessible only by a signature system corresponding to the manufacturer. For example, a signature system corresponding to the manufacturer is a certificate authority (CA) server of the manufacturer, and the CA server signs a software package to be downloaded to a device corresponding to the manufacturer.

It may be understood that, a digital signature technology may be considered as a combination of a digital digest technology and a public-private key technology. Whether the software package is tampered with may be verified by using the digital digest technology, and whether the digital digest is valid may be verified by using the public-private key technology. The digital signature technology is a technology that provides fast and comprehensive software integrity protection and verification for software packages.

Currently, software integrity protection and verification are implemented on a software package by using keys of the manufacturer (including a public key and a private key that are provided by the manufacturer). During specific implementation, on the one hand, the signature system of the manufacturer signs a software package by using a private key provided by the manufacturer, and the manufacturer prestores a public key corresponding to the private key. In this case, before the signed software package is loaded on a device, the prestored public key may be used, to verify a signature of the software package. In this way, software integrity of the software package run on the device is ensured by using a key provided by the manufacturer. Although security and reliability of software run on the device can be ensured to some extent, a user using the device needs to fully trust and rely on the manufacturer. When the key provided by the manufacturer is invalid, software integrity protection and verification cannot be implemented on the device, and a trust issue cannot be resolved for the user. That is, the user cannot independently upgrade and maintain the software on the device purchased by the user without the key provided by the manufacturer, affecting user experience of using the device.

In view of this, embodiments of this application provide a software integrity protection method and a software integrity verification method. A device 1 may store a first public key provided by a manufacturer to which the device 1 belongs and a second public key provided by a user A corresponding to the device 1. Dual keys provide a security guarantee for the device purchased by the user, thereby resolving a trust issue for the user and improving user experience of using the device.

On the one hand, a software integrity protection process may include: signing, in a signature system 1 of the user, a software package 1 by using a second private key corresponding to the second public key, to obtain a software package 2 including a signature a; and then before the software package 2 is downloaded to the device 1, signing, in a signature system 2 of the manufacturer, the software package 2 by using a first private key corresponding to the first public key, to obtain a software package 3 including the signature a and a signature b. In this way, not only the software package can be signed based on the key provided by the manufacturer, but also the software package can be signed based on the key provided by the user, and the key provided by the user is absolutely trustworthy to the user. That is, the embodiments of this application provide a software integrity protection manner that can be trusted by the user, without completely trusting or relying on the manufacturer. This resolves a trust issue for the user, thereby improving user experience of using the device.

On the other hand, for the software package 3 signed in the foregoing embodiments, before the software package 3 is loaded on the device 1, a process of performing software integrity verification on the software package 3 may include: The device 1 verifies the signature b of the software package 3 based on the first public key stored in the device 1, to obtain a signature verification result 1, and the device 1 verifies the signature a of the software package 3 based on the second public key stored in the device 1, to obtain a signature verification result 2. The device 1 may generate a verification result based on the signature verification result 1 and the signature verification result 2, where the verification result is used to represent software integrity of the software package 1, and if the signature verification result 1 and the verification result 2 both represent that corresponding signatures are valid, the verification result is used to represent that software integrity verification on the software package 1 succeeds; or if at least one of the signature verification result 1 and the verification result 2 represents that a corresponding signature is invalid, the verification result is used to represent that software integrity verification on the software package 1 fails. In this way, for a software package on which software integrity protection is performed by using keys provided by the manufacturer and the user, not only signature verification can be performed on the software package based on the key provided by the manufacturer, but also signature verification can be performed on the software package based on the key provided by the user, without completely trusting and relaying on the manufacturer. This resolves a trust issue for the user and provides a dual trustworthy basis for software integrity verification for the user, so that software integrity verification is more trustworthy, thereby improving user experience of using a device.

For example, one of scenarios in the embodiments of this application may be a scenario shown in FIG. 1. FIG. 1 is a schematic diagram of software integrity protection on a software package 200 run in a boot process of a device 100. In the scenario, a device 100, a manufacturer signature system 300, and a user signature system 400 are included. The manufacturer signature system 300 generates keys 1 (including a public key 1 and a private key 1) provided by a manufacturer for the device 100, to sign a software package 200 and provide a manufacturer public key 1. The user signature system 400 generates keys 2 (including a public key 2 and a private key 2) provided by a user for the device 100, to sign the software package 200 and provide a user public key 2. The manufacturer signature system 300 (for example, a CA server) is further configured to: receive the manufacturer public key 1 and the user public key 2, and burn the manufacturer public key 1 and the user public key 2 in advance in a system on chip (SoC) 110 included in the device 100. The device 100 may be specifically a network device such as a router or a switch. The SoC 110 on the device 100 is hardware, and an on-chip boot medium (BootROM) 111 may be integrated into a security subsystem on the SoC 110. The BootROM 111 is configured to start software integrity verification on the software package 200 at first time when the device 100 is powered on.

It should be noted that, in a case, the device manufacturer of the device 100 provides the software package 200 on the device 100 while providing the device 100, that is, the device manufacturer and a software manufacturer are a same party. In this case, the manufacturer signature system 300 may be a signature system jointly corresponding to the device manufacturer and the software manufacturer. In another case, the device manufacturer of the device 100 does not provide the software package 200 for the device 100, and the software package 200 is provided by an independent software manufacturer. In this case, the manufacturer signature system 300 may be a signature system corresponding to the software manufacturer or a third-party digital certificate authority that provides the software package 200.

In an example, a process of performing software integrity protection on the software package 200 may be, for example, obtaining the software package 200 from a server corresponding to the software manufacturer or a third-party platform, signing the software package 200 by using the private key 2 in the user signature system 400, and signing the software package 200 by using the private key 1 in the manufacturer signature system 300, to obtain a software package 200' carrying two signatures. In this case, when required by the device 100, the software package 200' may be downloaded to the device 100, for example, a flash memory of the device 100.

In another example, when the device 100 is powered on, a process of performing software integrity verification on the software package 200 before the software package 200 starts to be run may be, for example, as follows: The BootROM 111 of the device 100 may verify the two signatures of the software package 200' respectively based on the public key 1 and the public key 2 that are stored in the SoC 110, to obtain a verification result. When the verification result represents that both the signatures of the software package 200' are valid, the device 100 determines that the software package 200 is not tampered with and is provided by a legal software manufacturer, and the device 100 loads the software package 200.

It may be understood that, the public key 1 and the public key 2 may be stored in a one-time programmable memory (OTP), for example, an electric fuse (eFuse), of the SoC 110. Because burnt content on the eFuse cannot be changed, the public key 1 and the public key 2 can be reliably and securely stored in the eFuse.

It should be noted that, the public key 1 and the public key 2 may be stored independently in the SoC 110, or may be stored respectively in a root certificate 1 and a root certificate 2 corresponding to the public key 1 and the public key 2, and the public key 1 and the public key 2 are read respectively from the root certificate 1 and the root certificate 2.

It may be understood that, the scenario is merely a scenario example provided in the embodiments of this application, but the embodiments of this application are not limited to the scenario.

With reference to the accompanying drawings, the following describes in detail specific implementations of the software integrity protection method and the software integrity verification method in the embodiments of this application by using embodiments.

Figure 2:
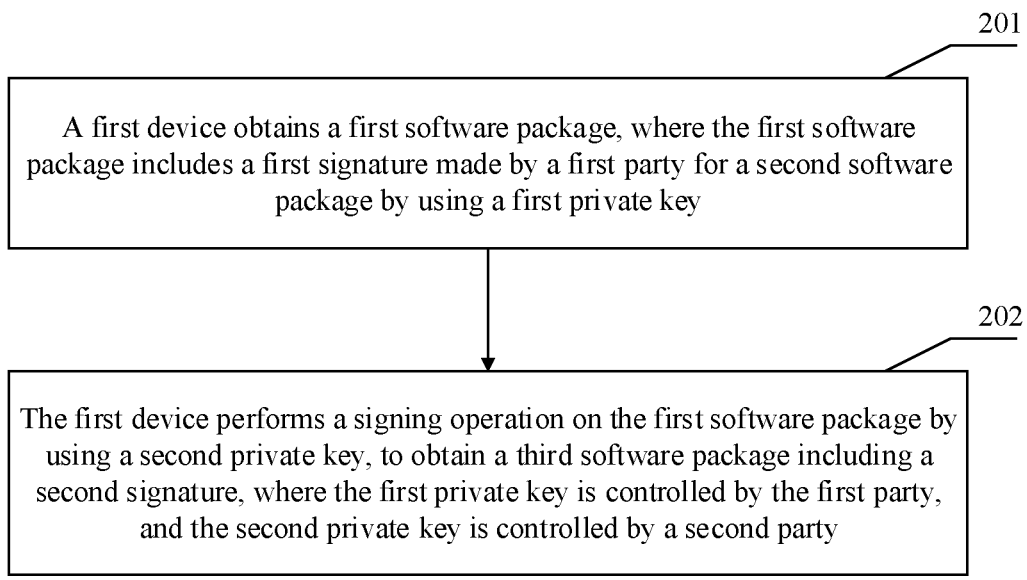
FIG. 2 is a schematic flowchart of a software integrity protection method according to an embodiment of this application.

FIG. 2 is a schematic flowchart of a software integrity protection method according to an embodiment of this application. The method may be applied to a manufacturer signature system corresponding to a second software package, or may be applied to a user signature system to which a user using the second device belongs. For example, for the scenario shown in FIG. 1, this embodiment may be performed by the manufacturer signature system 300 or the user signature system 400. The signature system, also referred to as a certificate issuing system, is configured to perform a signing operation on a to-be-protected software package or file by using a private key stored in the signature system, and may be specifically, for example, a CA server. The manufacturer signature system refers to a signature environment provided and maintained by a software manufacturer, and the user signature system refers to another signature environment provided and maintained by the user.

Refer to FIG. 2. In this embodiment, the manufacturer signature system (denoted as a first device below) corresponding to the second software package is used as an example to describe a method for software integrity protection on the second software package to be installed in the second device. The method may specifically include the following step 201 and step 202.

Step 201: A first device obtains a first software package, where the first software package includes a first signature made by a first party for the second software package by using a first private key.

It may be understood that, the second software package is a software package that is provided by the software manufacturer and that can meet a specific requirement of the user, and the second software package may be stored in a server of the software manufacturer or a third-party server. The user may obtain the second software package from a web page corresponding to the server of the software manufacturer, a software store corresponding to the third-party server, or another trustworthy device or system.

The first software package is a software package obtained after a user signature system corresponding to the user (that is, the first party) of the second device performs a signing operation on the second software package by using the first private key provided by the user. The first software package may include the first signature and the second software package. The first signature is a signature that corresponds to the second software package and that is obtained after a signing operation is performed on the second software package by using the first private key, and the first signature is used for subsequent software integrity verification on the second software package. For the signing operation on the second software, refer to the foregoing descriptions of the digital signature technology. Details are not described herein again.

During specific implementation, when the user needs to download the second software package to the second device, to perform software integrity protection on the second software package, that is, to ensure that the downloaded second software package is not tampered with and has a trustworthy source, before step 201, the user signature system first obtains the second software package, and performs the signing operation on the second software package by using the first private key provided by the user, to obtain the first software package including the first signature. In an example, the user signature system may send the first software package to a third-party management platform. In this case, step 201 may be specifically: A manufacturer signature system (that is, the first device) corresponding to the manufacturer of the second software package obtains the first software package from the third-party management platform. In another example, the user signature system may directly send the first software package to the first device. In other words, step 201 may be specifically: The first device directly obtains the first software package from the user signature system.

In some possible implementations, the second software package may include a plurality of boots, and the boots are classified into different levels based on a loading sequence when the second software package is run. Specifically, the first party may separately perform signing operations on the boots in the second software package by using a plurality of first private keys, and one first signature is correspondingly obtained for each boot. The plurality of first private keys may be the same or may be different. In an example, if the first private keys are the same, each boot may include a first certificate, and a first public key matching the first private key may be obtained from the first certificate, to perform a signature verification operation on a next-level boot of the boot. In addition, to save space, each boot may not include the first certificate, and for each boot, signature verification may be performed by using the first public key prestored in the first device. In another example, if the first private keys are different, that is, the user provides a plurality of groups of keys, and the first private keys in the different keys are used to sign different boots, each boot includes a first certificate, and a first public key may be obtained from the first certificate. The first public key matches a first private key used to perform a signing operation on a next-level boot, and the first public key is used to verify validity of a first signature of the next-level boot.

It should be noted that each level of boot in the first software package may carry a corresponding first signature, and other boots than the last boot each may also carry a first certificate.

Figure 3:
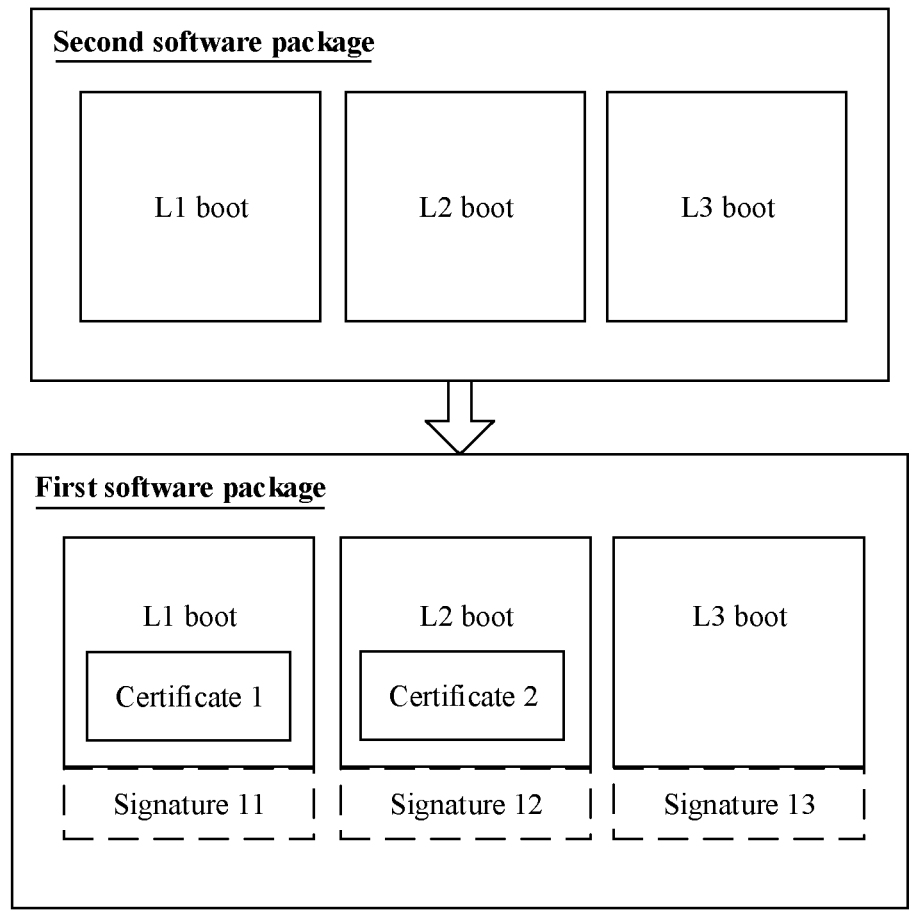
FIG. 3 is a schematic diagram of obtaining a first software package by performing a signing operation on a second software package according to an embodiment of this application.

For example, FIG. 3 is a schematic diagram of the first software package. FIG. 3 is used as an example. Assuming that the second software package includes an L1 boot, an L2 boot, and an L3 boot, the user signature system may perform signing operations on the three boots respectively by using a private key 11, a private key 12, and a private key 13, to obtain a signature 11, a signature 12, and a signature 13. The L1 boot may further include a certificate 1, and a public key 12 matching the private key 12 may be obtained from the certificate 1. Similarly, the L2 boot may further include a certificate 2, and a public key 13 matching the private key 13 may be obtained from the certificate 2. In addition, a public key 11 matching the private key 11 may be further used as a user root public key, and is prestored in the first device, to be used for subsequent signature verification.

In this way, it is ensured that a software package on which software integrity verification is performed subsequently is a software package obtained after a signing operation is performed based on a key provided by the user, and the user does not need to completely trust and rely on a manufacturer of the software package, so that it is possible to provide a software integrity protection manner that can be absolutely trusted by the user.

Step 202: The first device performs a signing operation on the first software package by using a second private key, to obtain a third software package including a second signature, where the first private key is controlled by the first party, and the second private key is controlled by a second party.

It may be understood that, the third software package is a software package obtained after the first device performs the signing operation on the obtained first software package by using the second private key provided by the manufacturer of the second software package or a third-party digital certificate authority (that is, the second party). The third software package may include the second signature and the first software package, or it may be considered that the third software package includes the first signature, the second signature, and the second software package. The second signature is a signature that is of the first software package and that is obtained after the signing operation is performed on the first software package by using the second private key, and the second signature is used for subsequent software integrity verification on the second software package. For the signing operation on the first software package, refer to the foregoing descriptions of the digital signature technology. Details are not described herein again.

In some possible implementations, an example in which the second software package includes a plurality of boots is used. The first device may separately perform signing operations on the boots in the second software package by using a plurality of second private keys, and one second signature is correspondingly obtained for each boot. The plurality of second private keys may be the same or may be different. In an example, if the second private keys are the same, each boot may include a second certificate, and a second public key matching the second private key may be obtained from the second certificate, to perform a signature verification operation on a next-level boot of the boot. In addition, to save space, each boot may not include the second certificate, and for each boot, signature verification may be performed by using the second public key prestored in the second device. In another example, if the second private keys are different, that is, the software manufacturer provides a plurality of groups of keys, and the second private keys in the different keys are used to sign different boots, each boot includes a second certificate, and the second public key may be obtained from the second certificate. The second public key matches a second private key used to perform a signing operation on a next-level boot, and the second public key is used to verify validity of a second signature of the next-level boot.

It should be noted that each level of boot in the third software package may carry a corresponding first signature and a corresponding second signature, and other boots than the last boot each may also carry a first certificate and a second certificate.

Figure 4:
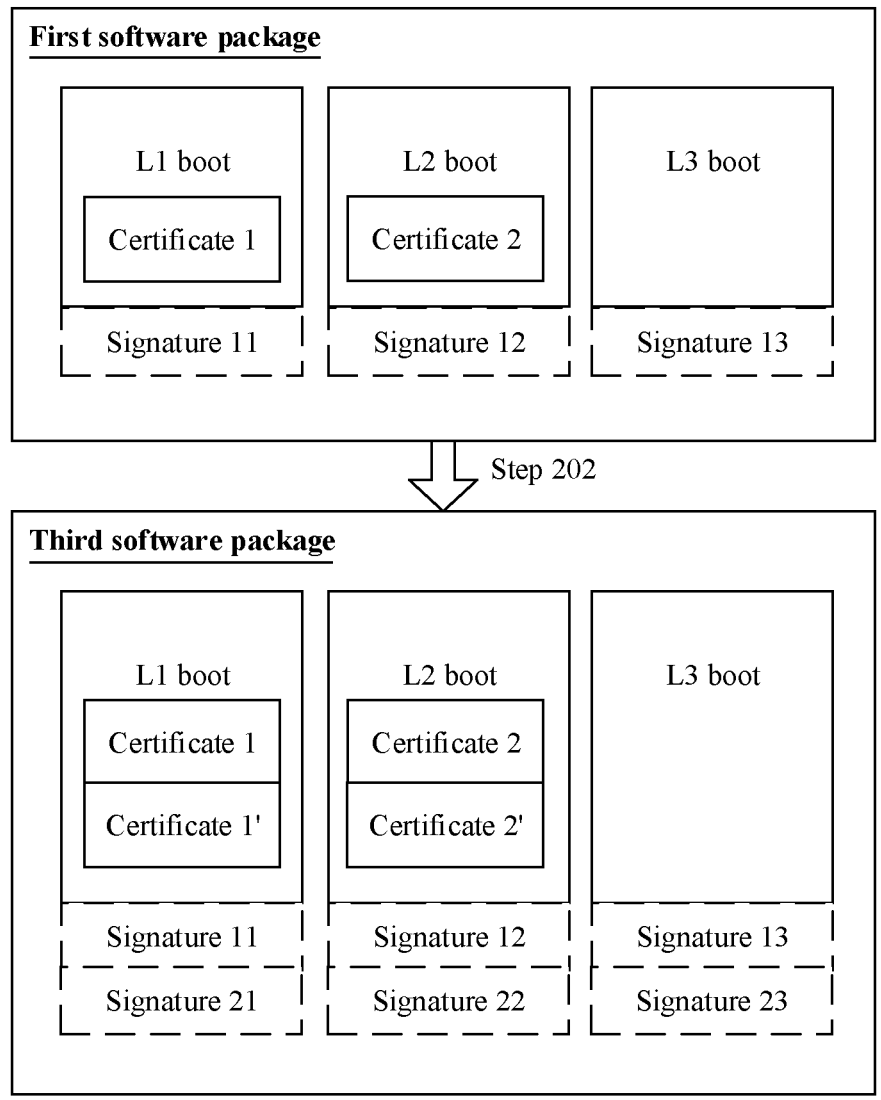
FIG. 4 is a schematic diagram of obtaining a third software package by performing a signing operation on a first software package according to an embodiment of this application.

For example, FIG. 4 is a schematic diagram of the third software package. Assuming that the first software package obtained in step 201 is that shown in FIG. 3, the first device may perform signing operations on the three boots respectively by using a private key 21, a private key 22, and a private key 23, to obtain a signature 21, a signature 22, and a signature 23. The L1 boot may further include a certificate 1', and a public key 22 matching the private key 22 may be obtained from the certificate 1'. Similarly, the L2 boot may further include a certificate 2', and a public key 23 matching the private key 23 may be obtained from the certificate 2'. In addition, a public key 21 matching the private key 21 may be further used as a manufacturer root public key, and is prestored in the first device, to be used for subsequent signature verification.

It may be understood that, after dual signing operations are performed on the second software package, before the third software package is downloaded to the second device, the third software package may be signed as a whole by using the first device, so that after subsequently downloading the third software package, the second device first succeeds in signature verification on the third software package as a whole, and determines whether overall software integrity of the third software package is valid.

In some possible implementations, the first private key, the second private key, the first public key, and the second public key may be keys obtained after a key provided by the user and a key provided by the manufacturer are processed, and a signing operation and a signature verification operation are performed on a software package by using the processed keys, so that a quantity of times that an original private key (referred to as a primary private key below) is exposed can be effectively reduced, and security of the software package can be improved. It may be understood that, the first private key and the first public key are used as an example. If the first private key is a private key obtained after the primary private key is processed, a primary public key matching the primary private key also needs to be processed, to obtain the first public key matching the first private key.

In addition, in this embodiment of this application, a root public key may be further processed by using a secure hash algorithm (SHA) (for example, SHA256). In this way, for a root public key that needs to be stored in a hardware register of the second device, a 4096-bit root public key may be converted into a 256-bit primary public key, thereby greatly saving hardware storage resources of the second device. A secondary private key is obtained by processing the primary private key, and the secondary private key is used to perform a signing operation on a certificate including the secondary public key. When validity of the certificate needs to be verified, the primary public key may be processed to obtain a secondary public key corresponding to the primary public key. The secondary public key may be used to perform a signature verification operation on a signature of the certificate, to determine the validity of the certificate and validity of the secondary public key in the certificate.

It should be noted that, for the user, in a process of producing the device or using the device, the user may request to enable a dual signing permission and a dual signature verification permission based on an actual requirement. When the user has the dual signing permission and the dual signature verification permission, software integrity protection may be performed by using this embodiment. Alternatively, the user may request to enable a user signing permission and a user signature verification permission based on an actual requirement. When the user has the user signing permission and the user signature verification permission, in a manner, software integrity protection may be performed by using this embodiment; in another manner, a signing operation may alternatively be performed on the second software package by using only the first private key, to obtain the first software package including the first signature, without performing step 202.

It should be noted that, this embodiment of this application may alternatively be performed by the user signature system. In this case, the first party may be the manufacturer of the second software package or the third-party digital certificate authority, and the second party may be the user of the second software package. For specific implementations and related descriptions of concepts, refer to related descriptions in the foregoing embodiments.

In this way, according to the software integrity protection method provided in this embodiment of this application, not only the software package can be signed based on the key provided by the manufacturer, but also the software package can be signed based on the key provided by the user, so that the user does not need to completely trust and rely on the manufacturer, to provide a trustworthy dual signature mechanism for the software package and also provide dual data bases for subsequent software integrity verification. This resolves a trust issue for the user, thereby improving user experience of using the device.

After the dual signing operations are performed on the second software package according to the foregoing embodiment shown in FIG. 2, and before the software integrity verification is performed on the software package according to the following FIG. 3, on the one hand, the first public key and the second public key may be stored in an SoC of the second device; on the other hand, the second device stores a list of dual signature verification devices with a dual signature verification permission.

The second public key may be a public key that is stored in the SoC of the second device when the second device is produced. In addition, before delivery of the second device, field segments for storing the first public key, a dual-root enable bit, and a switching enable bit may be reserved in the SoC. The first public key may be sent by the user signature system to the second device by using the manufacturer signature system when the second device is produced or when the second device is used, and is stored in the SoC of the second device. It may be understood that, to improve security, the user signature system or the manufacturer signature system may alternatively perform a signing operation on a file including the first public key and then send the file to the second device, and the second device stores the first public key only after signature verification succeeds.

It may be understood that, if the second device has a dual signature verification permission, and the field segment of the dual-root enable bit is reserved in the SoC of the second device, a value of the dual-root enable bit is valid, to indicate to perform dual signature verification on the second software package before the second software package is loaded. If the second device has a user signature verification permission, the field segment of the switching enable bit is further reserved in the SoC of the second device, and a priority of the switching enable bit is set to be higher than a priority of the dual-root enable bit, a value of the switching enable bit is valid, to indicate to perform signature verification on the second software package by using a user key before the second software package is loaded. The field segments of the dual-root enable bit and the switching enable bit are reserved at delivery of the second device, and the values of the bits may be configured when the second device is produced or used. In other words, the user may flexibly configure, based on a requirement, a manner of performing software integrity verification by the second device.

For the software manufacturer (or a device manufacturer), the dual-root enable bit (or the switching enable bit) and the first public key may be included in a same file, and the signature system (for example, the CA server) corresponding to the second device performs a signing operation on the file, and then sends the file to the second device. In this case, before storing the first public key and the value of the dual-root enable bit (or the value of the switching enable bit) in the file, the second device not only needs to succeed in verification on a signature of the file, but also needs to determine whether the dual signature verification permission is enabled for the second device.

The dual signature verification device list may be used to determine whether the dual signature verification permission is enabled for the second device. The dual signature verification device list is used to indicate a device currently authorized to perform dual signature verification, and may include an identifier of each device authorized to perform dual signature verification. Specifically, the software manufacturer may collect all devices currently authorized to perform dual signature verification, generate a dual signature verification device list based on identifiers of these devices, and send the dual signature verification device list to the signature system corresponding to the second device to perform a signing operation, and obtain a signed dual signature verification device list.

During specific implementation, when the second device needs to enable a dual signature verification function, before or when the second device downloads the file including the first public key and the dual-root enable bit (or the switching enable bit) from the signature system corresponding to the second device, the second device may alternatively download the signed dual signature verification device list from the signature system corresponding to the second device. In an example, a central processing unit (CPU) of the second device may verify a signature of the dual signature verification device list. After the signature verification succeeds, the CPU checks whether an identifier of the second device is in the dual signature verification device list, where the device identifier of the second device is stored in the SoC of the second device. In a case, when the device identifier of the second device belongs to the dual signature verification device list, it may be determined that the second device is a device authorized to enable the dual signature verification permission, and the CPU may enable a dual signature verification mechanism, and send the file including the first public key and the dual-root enable bit (or the switching enable bit) to a security hardware engine of the second device, so that the security hardware engine performs signature verification on the file, and configures the second device based on the file. In another case, when the device identifier of the second device does not belong to the dual signature verification device list, it may be determined that the second device is not authorized to enable the dual signature verification permission. In this case, downloading of the file including the first public key and the dual-root enable bit (or the switching enable bit) may be terminated, or configuration of the second device based on the file is terminated. In another example, the foregoing operations such as verifying the signature of the dual signature verification device list, checking whether the identifier of the second device is in the dual signature verification device list, and enabling the dual signature verification mechanism may all be performed by the security hardware engine of the second device. That is, when the security hardware engine determines that the second device is authorized to enable the dual signature verification permission, the security hardware engine may enable the dual signature verification mechanism, perform signature verification on the received file including the first public key and the dual-root enable bit (or the switching enable bit), and configure the second device based on the file.

Figure 5:
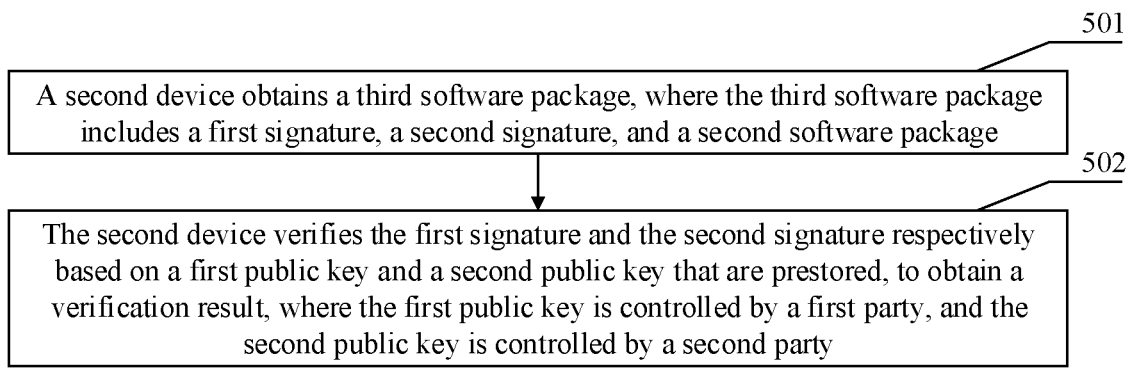
FIG. 5 is a schematic flowchart of a software integrity verification method according to an embodiment of this application.

It may be understood that, after the third software package is obtained by performing the dual signing operations on the second software package according to the embodiment shown in FIG. 3, the third software package is downloaded to the second device, and before loading the second software package, the second device may perform software integrity verification according to the following embodiment shown in FIG. 5, to ensure that loaded software is trustworthy and secure.

FIG. 5 is a schematic flowchart of a software integrity verification method according to an embodiment of this application. The method is applied to a second device, for example, the device 100 in the foregoing scenario shown in FIG. 1, which may be specifically the BootROM 111 in the device 100. Refer to FIG. 5. The method may include, for example, the following step 501 and step 502:

Step 501: The second device obtains a third software package, where the third software package includes a first signature, a second signature, and a second software package.

Step 502: The second device verifies the first signature and the second signature respectively based on a first public key and a second public key that are prestored, to obtain a verification result, where the first public key is controlled by a first party, and the second public key is controlled by a second party.

In a case, the first party may be a user of the second software package, and the second party is a manufacturer of the second software package or a third-party digital certificate authority. In another case, alternatively, the first party may be a manufacturer of the second software package or a third-party digital certificate authority, and the second party is a user of the second software package.

It may be understood that, an example in which the first party is the user of the second software package, and the second party is the manufacturer of the second software package or the third-party digital certificate authority is used. The first signature may be obtained by performing a signing operation on the second software package by using a first private key, and the first signature and the second software package are included in a first software package. The second signature may be obtained by performing a signing operation on the first software package by using a second private key. The first private key matches the first public key, and the second private key matches the second public key.

For step 502, in an example, when a dual signature verification mechanism is used, the second device may obtain the first public key and the second public key from a trustworthy storage area (for example, an OTP), and verify the first signature and the second signature of the third software package respectively based on the first public key and the second public key. In another example, when a user signature verification mechanism is used, the second device may obtain the first public key from a trustworthy storage area (for example, an OTP), and verify the first signature of the third software package based on the first public key.

It may be understood that, a dual-root enable bit and/or a switching enable bit may be further configured in an SoC of the second device, and values/a value of the dual-root enable bit and/or the switching enable bit are/is used to indicate a verification mechanism that needs to be used for software integrity verification. The values/value of the dual-root enable bit and/or the switching enable bit cannot be modified once stored. For example, the values/value of the dual-root enable bit and/or the switching enable bit may be burnt in an eFuse of the SoC. In addition, when the values of the dual-root enable bit and the switching enable bit are simultaneously burnt, and the values of the two bits are both valid, a priority of the switching enable bit may be further configured to be higher than a priority of the dual-root enable bit, that is, the user signature verification mechanism corresponding to a case in which the switching enable bit is valid is used.

In an example, when the second device stores only the dual-root enable bit and the dual-root enable bit is valid, or when the switching enable bit on the second device is invalid and the dual-root enable bit on the second device is valid, for example, step 502 may include: S11: The second device verifies the first signature based on the prestored first public key, to obtain a first signature verification result, where the first signature verification result is used to represent whether the first signature is valid. S12: The second device verifies the second signature based on the prestored second public key, to obtain a second signature verification result, where the second signature verification result is used to represent whether the second signature is valid. S13: The second device generates the verification result based on the first signature verification result and the second signature verification result, where the verification result is used to represent whether software integrity verification on the second software package succeeds. In a case, when the first signature verification result represents that the first signature is valid and the second signature verification result represents that the second signature is valid, the verification result represents that the integrity verification on the second software package succeeds. In another case, when the first signature verification result represents that the first signature is invalid and/or the second signature verification result represents that the second signature is invalid, the verification result represents that the integrity verification on the second software package fails.

In another example, when the second device stores the switching enable bit and the switching enable bit is valid, regardless of whether the second device stores the dual-root enable bit and whether the dual-root enable bit is valid, for example, step 502 may include: S21: The second device verifies the first signature based on the prestored first public key, to obtain a first signature verification result, where the first signature verification result is used to represent whether the first signature is valid. S22: The second device generates the verification result based on the first signature verification result, where the verification result is used to represent whether software integrity verification on the second software package succeeds. In a case, when the first signature verification result represents that the first signature is valid, the verification result represents that the integrity verification on the second software package succeeds. In another case, when the first signature verification result represents that the first signature is invalid, the verification result represents that the integrity verification on the second software package fails.

In still another example, when the second device does not store the dual-root enable bit or the switching enable bit, or when the dual-root enable bit and the switching enable bit on the second device are both invalid, for example, step 502 may include: S31: The second device verifies the second signature based on the prestored second public key, to obtain a second signature verification result, where the second signature verification result is used to represent whether the second signature is valid. S32: The second device generates the verification result based on the second signature verification result, where the verification result is used to represent whether software integrity verification on the second software package succeeds. In a case, when the second signature verification result represents that the second signature is valid, the verification result represents that the integrity verification on the second software package succeeds. In another case, when the second signature verification result represents that the second signature is invalid, the verification result represents that the integrity verification on the second software package fails. It should be noted that, the signature verification mechanism used in this embodiment may be referred to as a manufacturer signature verification mechanism (which may also be referred to as a single-root signature verification mechanism).

It may be understood that, when the verification result represents that the software integrity verification on the second software package succeeds, the second device may load the second software package. For a software package including a plurality of boots, the boots in the software package are verified sequentially based on a loading sequence according to the method in this embodiment of this application. When it is determined that software integrity verification on a boot at a level succeeds, the boot at this level is loaded. Software integrity verification continues to be performed on a next-level boot by using the boot at this level, until a verification result represents that software integrity verification on a boot at a specific level fails or all the boots are loaded.

It may be understood that, after a signing operation, the software package including the plurality of boots may include a signature of the boot and a code segment in the boot, and may further include a certificate. The certificate is used to verify a next-level boot, that is, a public key for verifying validity of a signature of the next-level boot may be obtained from the certificate. In this case, in a verification operation shown in FIG. 5, in an example, if the certificate and the code segment in the boot are signed together, the first device may determine, through one verification, that the code segment in the boot is valid and the certificate in the boot is valid. In another example, if the certificate and the code segment in the boot are separately signed, the first device may alternatively perform two verifications, that is, the SoC first verifies a signature 1 of the boot, to determine whether the code segment in the boot is valid, and then when it is determined that the code segment in the boot is valid, the boot verifies a signature 2 of the boot, to determine whether the certificate in the boot is valid, where the signature 1 and the signature 2 may be the same. For a specific implementation, refer to the following embodiments shown in FIG. 7 to FIG. 9. In this way, whether each boot in the software package is valid may be determined through one verification or two verifications, to provide a reliable basis for verifying the signature of the next-level boot based on the certificate in the boot.

In some possible implementations, the SoC may alternatively store a first digest calculated for the second software package by using a digital digest technology. In this case, in the second software package including a plurality of boots, a signing operation may be performed on other boots than a level-1 boot. Verification on the level-1 boot may include: First, the SoC of the second device obtains only a code segment in the level-1 boot, and calculates, by using a hash algorithm, a second digest corresponding to the code segment in the level-1 boot. Then the SoC determines, through comparison, whether the first digest is consistent with the second digest; and if the first digest is consistent with the second digest, determines that the level-1 boot is valid, and loads the level-1 boot. For a specific implementation, refer to the following embodiments shown in FIG. 10 and FIG. 11.

In some other possible implementations, if the first signature and the second signature are signatures obtained after signing operations are performed by using secondary private keys, and the first public key and the second public key that are prestored in the second device are also secondary public keys, before each signature is verified, this embodiment of this application may further include the following two steps: Step 1: Read an original root public key from a flash memory, calculate a hash value of the original root public key, verify whether the hash value is consistent with that of a primary public key, and if the hash value is consistent with that of the primary public key, determine that the primary public key is valid. Step 2: Read a certificate, perform signature verification on the certificate by using a secondary public key that is obtained by processing the primary public key, and if the signature verification succeeds, determine that a secondary public key prestored in the certificate is valid, where a signing operation is performed on the certificate by using a secondary private key that is obtained by processing a primary private key. In this way, not only software integrity verification can be performed on the second software package to be loaded on the second device, but also a quantity of times that the original root private key is exposed can be reduced, thereby improving security and reliability of the second device. In addition, storage space on the SoC can also be saved.

Currently, before delivery of the second device, the second device usually performs item coding on the second public key in the code segment 1 of the SoC of the second device. In this case, during delivery and use of the second device, if a dual signature verification mechanism or a user signature verification mechanism is required, the code segment needs to be modified, and there is difficulty in implementation. To improve experience of using the second device, in this embodiment of this application, the second public key is extracted from the code segment, and is appended to the code segment 2 in a form of a single file 1. That is, before delivery of the second device, a layout in the flash memory may be represented, for example, as "header file+code segment 2+file 1". In this way, when the dual signature verification mechanism is enabled during use of the second device, only a file 2 needs to be separately added to the flash memory to store the first public key. In this case, a layout in the flash memory may be represented, for example, as "header file+code segment 2+file 1+file 2". In this way, work difficulty caused by a change in the signature verification mechanism for the user is greatly reduced, and user experience of using the second device is improved.

Figure 6:
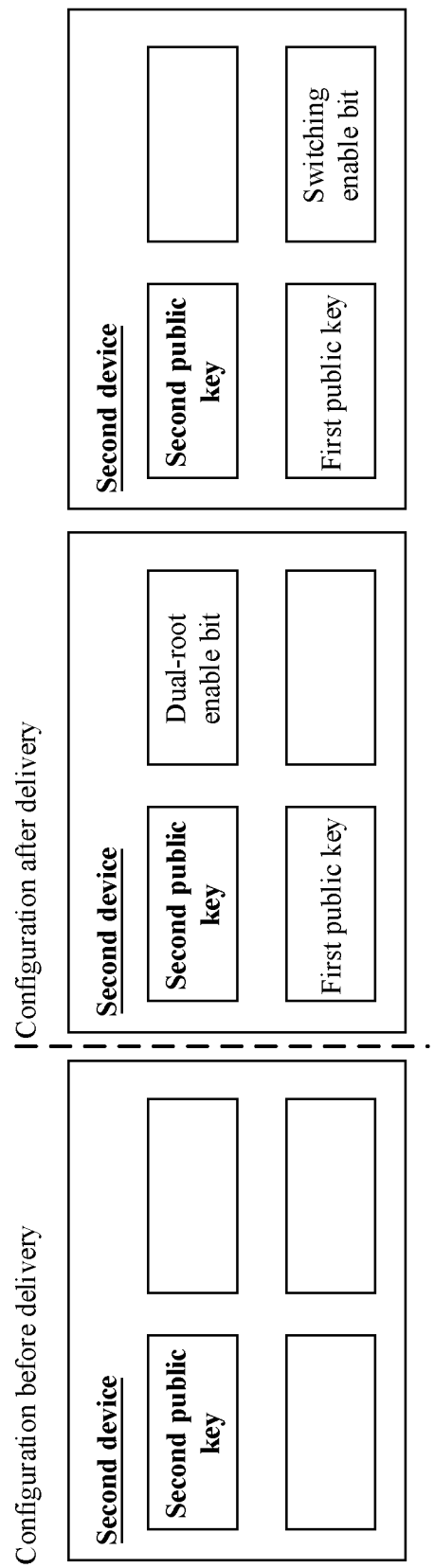
FIG. 6 is a schematic diagram of a first device according to an embodiment of this application.

In some other possible implementations, based on a layout design in the flash memory, as shown in FIG. 6, before delivery of the second device, the second device stores only the second public key, but reserves field segments for storing the first public key and the two enable bits. When the second device is put into use after delivery, in a case, the first public key and a valid value of the dual-root enable bit may be configured at reserved locations in response to a request of the user that needs to use the dual signature verification mechanism. In another case, the first public key and a valid value of the switching enable bit may be configured at reserved locations in response to a request of the user that needs to use the user signature verification mechanism. In this way, based on the layout design in the flash memory and the method for burning information when only the second public key is stored and other space is reserved for use by the user before delivery, the following problem can be resolved: When different second devices are used by different users after delivery from manufacturers, due to different user and market requirements, the signature verification mechanism needs to be changed, but because item coding is performed on the second public key in the code segment, item coding in the SoC needs to be split. As a result, it is difficult for the user to change the signature verification mechanism. This improves user experience of using the second device.

In this way, for a software package on which software integrity protection is performed by using keys provided by a software manufacturer (or a device manufacturer) and a user, not only signature verification can be performed on the software package based on the key provided by the software manufacturer, but also signature verification can be performed on the software package based on the key provided by the user, without completely trusting and relying on the software manufacturer, and the user may flexibly determine a signature verification mechanism to be used, to resolve a trust issue for the user, so that software integrity verification on the second device is more flexible and trustworthy. This improves user experience of using the second device.

To describe the embodiments of this application more clearly and in more detail, the software integrity verification before a boot of the second device is used as an example below to describe a software integrity verification process in the embodiments of this application by using two examples.

Figure 7:
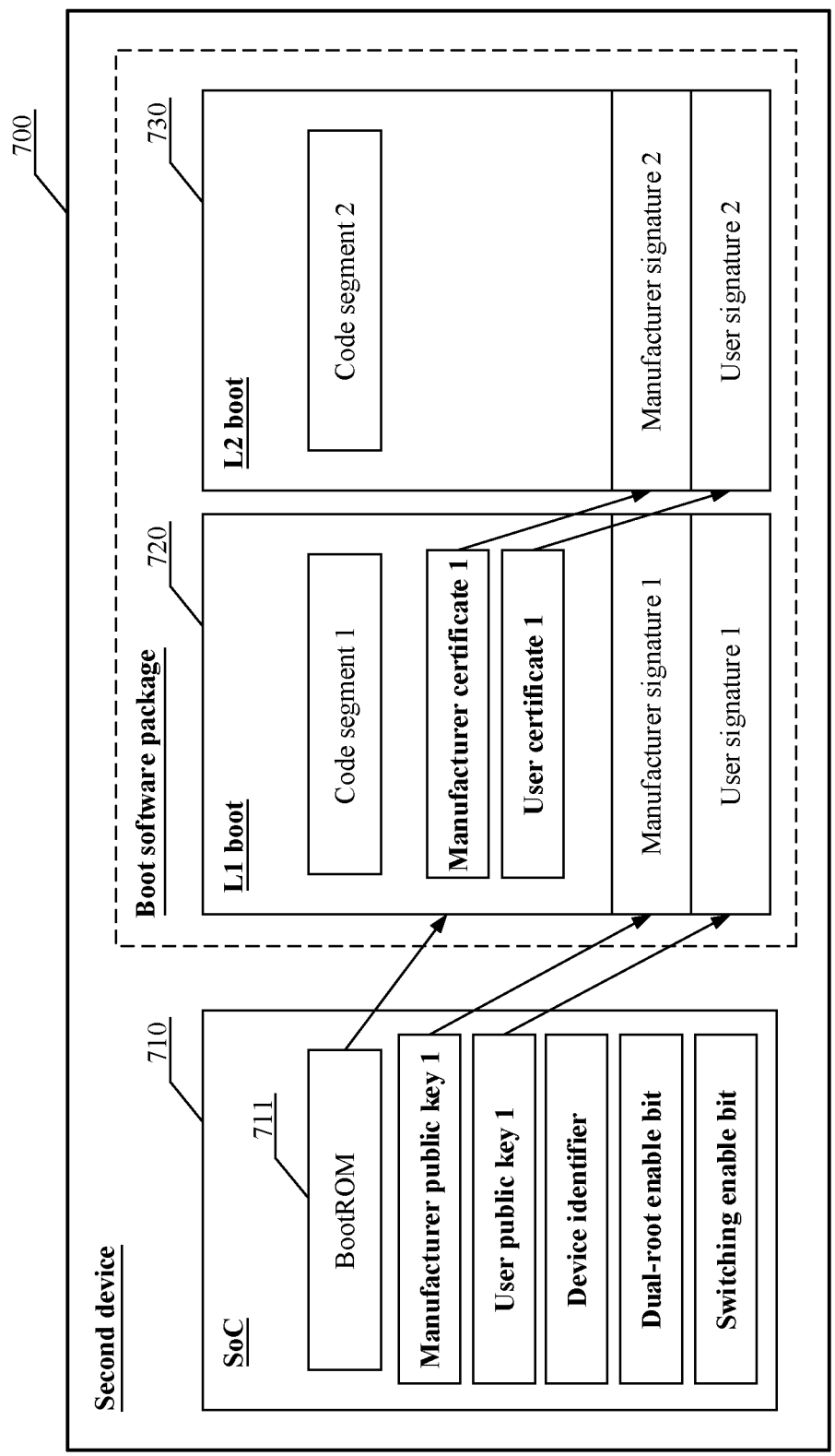
FIG. 7 is a schematic diagram of a scenario for software integrity verification according to an embodiment of this application.

Embodiment 1: A scenario shown in FIG. 7 is used as an example. In the scenario, a second device 700 includes an SoC 710 and a boot software package, and the boot software package includes an L1 boot 720 and an L2 boot 730. The SoC 710 includes a BootROM 711, and stores a manufacturer public key 1, a user public key 1, a device identifier, a value of a dual-root enable bit, and a value of a switching enable bit. The L1 boot 720 includes a code segment 1, a manufacturer certificate 1, a user certificate 1, a manufacturer signature 1, and a user signature 1. The L2 boot 730 includes a code segment 2, a manufacturer signature 2, and a user signature 2.

Figure 8A:
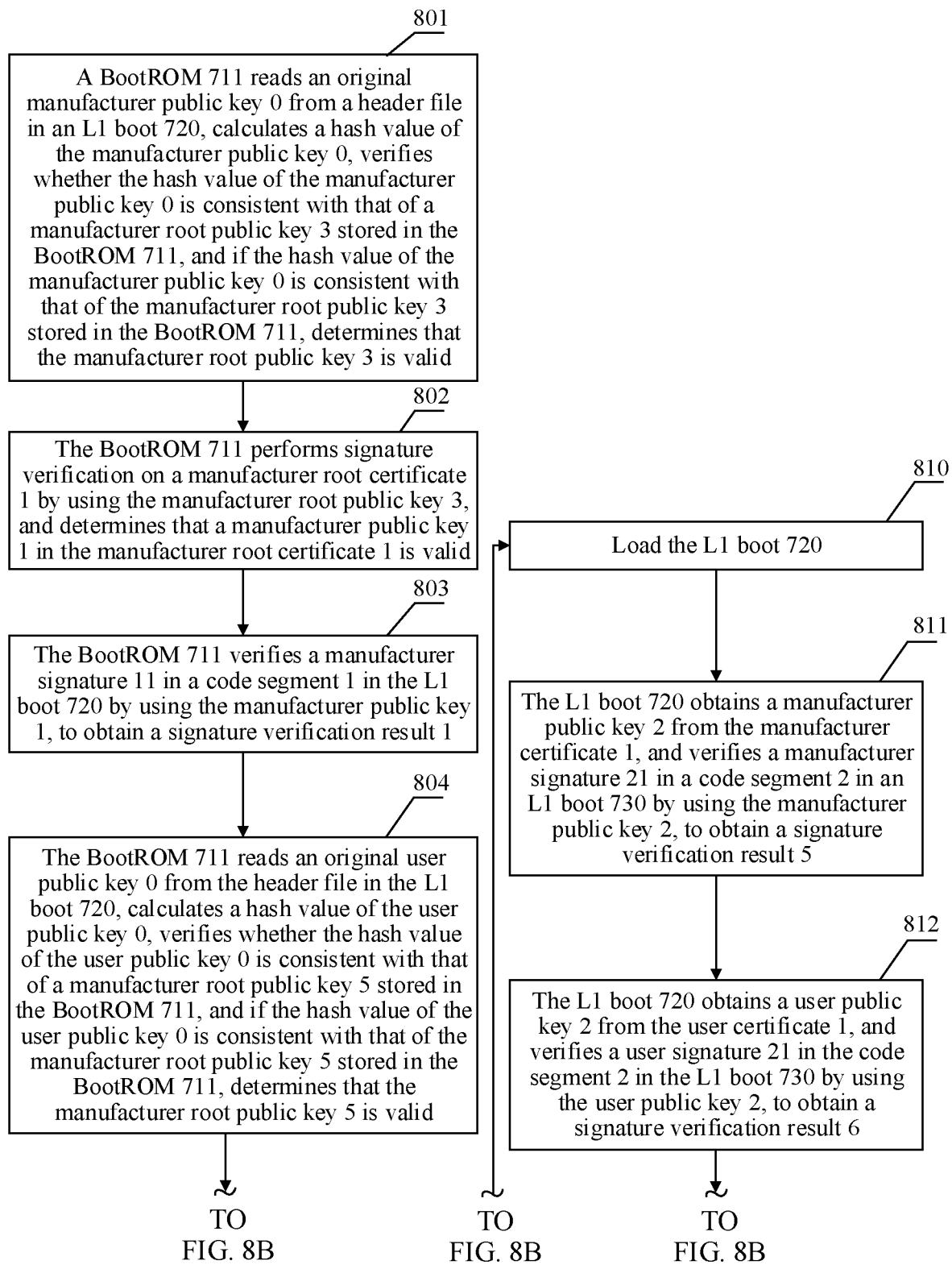
FIG. 8A and FIG. 8B are a schematic flowchart of an example of software integrity verification according to an embodiment of this application.
Figure 8B:
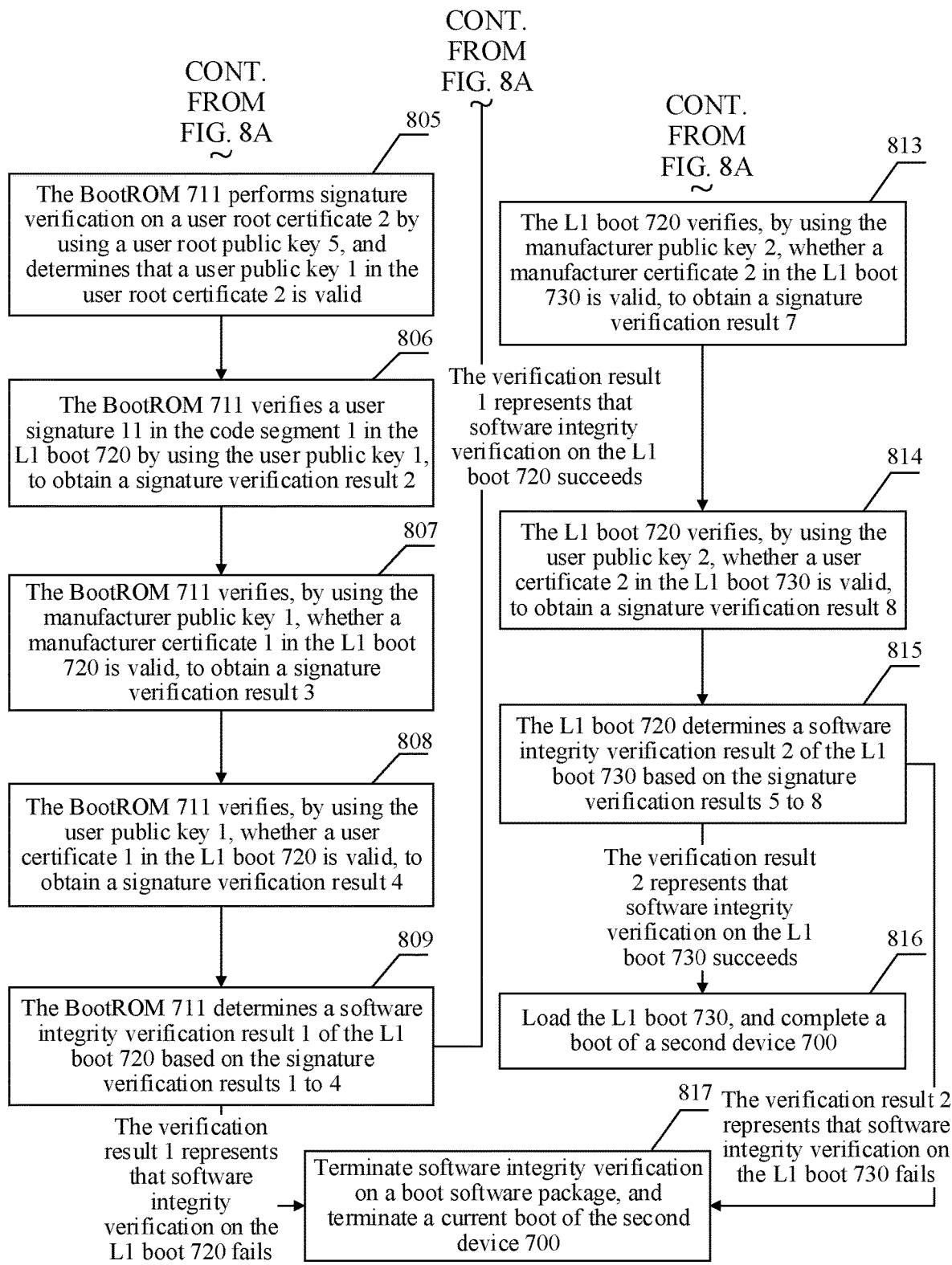

In an example, it is assumed that on the second device 700 shown in FIG. 7, the value of the dual-root enable bit indicates that the dual-root enable bit is valid, the value of the switching enable bit indicates that the switching enable bit is invalid, and the device identifier is included in a dual signature verification device list. If the certificate and the code segment in each boot are signed separately, that is, the manufacturer signature 1 includes a manufacturer signature 11 corresponding to the code segment 1 and a manufacturer signature 12 corresponding to the manufacturer certificate 1, the user signature 1 includes a user signature 11 corresponding to the code segment 1 and a user signature 12 corresponding to the user certificate 1, as shown in FIG. 8A and FIG. 8B, this embodiment of this application specifically includes the following steps.

Step 801: The BootROM 711 reads an original manufacturer public key 0 from a header file in the L1 boot 720, calculates a hash value of the manufacturer public key 0, verifies whether the hash value of the manufacturer public key 0 is consistent with that of a manufacturer root public key 3 stored in the BootROM 711, and if the hash value of the manufacturer public key 0 is consistent with that of the manufacturer root public key 3 stored in the BootROM 711, determines that the manufacturer root public key 3 is valid.

Step 802: The BootROM 711 performs signature verification on a manufacturer root certificate 1 by using the manufacturer root public key 3, and determines that a manufacturer public key 1 in the manufacturer root certificate 1 is valid.

It may be understood that, the manufacturer root certificate 1 is a certificate on which perform a signing operation is performed by using a secondary root private key 4, and the secondary root private key 4 is obtained by processing a primary root private key 5. The manufacturer root certificate 1 includes the manufacturer public key 1. In step 802, the manufacturer root public key 3 may be processed first to obtain a corresponding secondary root public key 4. A signature of the manufacturer certificate 1 is verified by using the secondary root public key 4. If the secondary root public key 4 matches the secondary root private key 4, and the manufacturer certificate 1 is not tampered with, the signature verification succeeds, representing that the manufacturer root certificate 1 is valid, and the manufacturer public key 1 in the certificate is valid.

Step 803: The BootROM 711 verifies the manufacturer signature 11 in the code segment 1 in the L1 boot 720 by using the manufacturer public key 1, to obtain a signature verification result 1.

Step 804: The BootROM 711 reads an original user public key 0 from the header file in the L1 boot 720, calculates a hash value of the user public key 0, verifies whether the hash value of the user public key 0 is consistent with that of a manufacturer root public key 5 stored in the BootROM 711, and if the hash value of the user public key 0 is consistent with that of the manufacturer root public key 5 stored in the BootROM 711, determines that the manufacturer root public key 5 is valid.

Step 805: The BootROM 711 performs signature verification on a user root certificate 2 by using a user root public key 5, and determines that a user public key 1 in the user root certificate 2 is valid.

Step 806: The BootROM 711 verifies the user signature 11 in the code segment 1 in the L1 boot 720 by using the user public key 1, to obtain a signature verification result 2.

It should be noted that, for related descriptions of step 804 to step 806, refer to step 801 to step 803.

It should be noted that an execution sequence of step 804 to step 806 and step 801 to step 803 is not specifically limited. Step 804 to step 806 may be performed before step 801 to step 803, step 801 to step 803 may be performed before step 804 to step 806, or step 804 to step 806 and step 801 to step 803 may be performed simultaneously.

Step 807: The BootROM 711 verifies, by using the manufacturer public key 1, whether the manufacturer certificate 1 in the L1 boot 720 is valid, to obtain a signature verification result 3.

Step 808: The BootROM 711 verifies, by using the user public key 1, whether the user certificate 1 in the L1 boot 720 is valid, to obtain a signature verification result 4.

Step 809: The BootROM 711 determines, based on the signature verification results 1 to 4, a verification result 1 for indicating software integrity of the L1 boot 720. If the verification result 1 represents that software integrity verification on the L1 boot 720 succeeds, the following step 810 to step 816 are performed; or if the verification result 1 represents that software integrity verification on the L1 boot 720 fails, step 817 is performed.

It may be understood that, the verification result 1 can represent that the software integrity verification on the L1 boot 720 succeeds, only when the signature verification results 1 to 4 all indicate states in which the signature verification succeeds. The verification result 1 represents that the software integrity verification on the L1 boot 720 fails, provided that a state in which the signature verification fails exists in the signature verification results 1 to 4.

Step 810: Load the L1 boot 720.

Step 811: The L1 boot 720 obtains a manufacturer public key 2 from the manufacturer certificate 1, and verifies the manufacturer signature 21 in the code segment 2 in the L1 boot 730 by using the manufacturer public key 2, to obtain a signature verification result 5.

Step 812: The L1 boot 720 obtains a user public key 2 from the user certificate 1, and verifies the user signature 21 in the code segment 2 in the L1 boot 730 by using the user public key 2, to obtain a signature verification result 6.

Step 813: The L1 boot 720 verifies, by using the manufacturer public key 2, whether a manufacturer certificate 2 in the L1 boot 730 is valid, to obtain a signature verification result 7.

Step 814: The L1 boot 720 verifies, by using the user public key 2, whether a user certificate 2 in the L1 boot 730 is valid, to obtain a signature verification result 8.

Step 815: The L1 boot 720 determines, based on the signature verification results 5 to 8, a verification result 2 for indicating software integrity of the L1 boot 730. If the verification result 2 represents that software integrity verification on the L1 boot 730 succeeds, the following step 816 is performed; or if the verification result 2 represents that software integrity verification on the L1 boot 730 fails, step 817 is performed.

It may be understood that, the verification result 2 can represent that the software integrity verification on the L1 boot 730 succeeds, only when the signature verification results 5 to 8 all indicate states in which the signature verification succeeds. The verification result 2 represents that the software integrity verification on the L1 boot 730 fails, provided that a state in which the signature verification fails exists in the signature verification results 5 to 8.

Step 816: Load the L1 boot 730, and complete a boot of the second device 700.

Step 817: Terminate software integrity verification on the boot software package, and terminate a current boot of the second device 700.

In this way, the software integrity verification on the boot software package is completed by using a dual signature verification mechanism, to ensure that software loaded when the second device is booted is secure and trustworthy, thereby providing a reliable environment for a user to use the second device.

Figure 9:
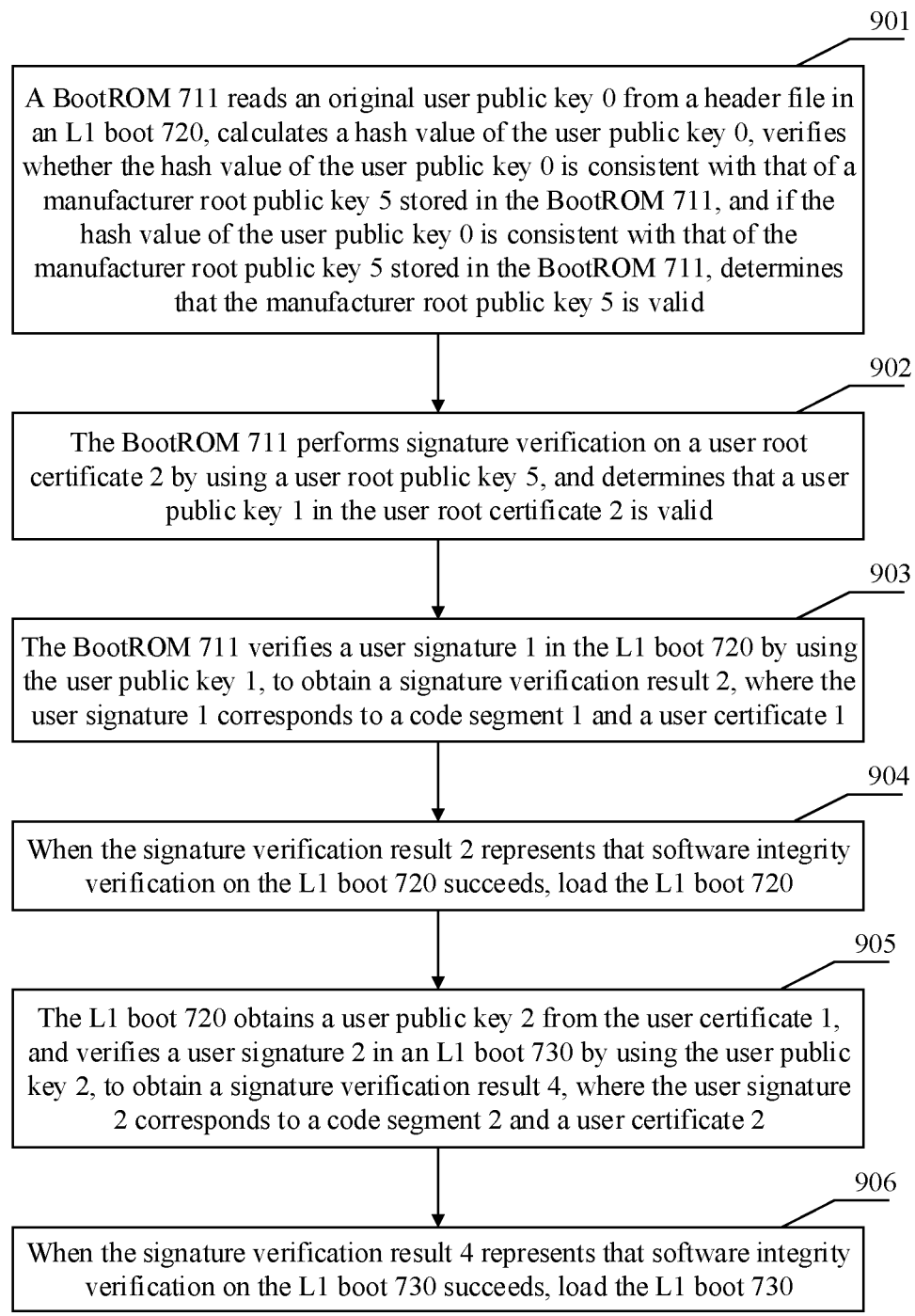
FIG. 9 is a schematic flowchart of another example of software integrity verification according to an embodiment of this application.

In another example, it is assumed that on the second device 700 shown in FIG. 7, the value of the dual-root enable bit indicates that the dual-root enable bit is valid, the value of the switching enable bit indicates that the switching enable bit is also valid, and the device identifier is included in a dual signature verification device list. If the certificate and the code segment in each boot are uniformly signed, that is, a signature verification result of the manufacturer signature 1 may represent validity of both the code segment 1 and the manufacturer certificate 1, as shown in FIG. 9, this embodiment of this application specifically includes the following steps.

Step 901: The BootROM 711 reads an original user public key 0 from a header file in the L1 boot 720, calculates a hash value of the user public key 0, verifies whether the hash value of the user public key 0 is consistent with that of a manufacturer root public key 5 stored in the BootROM 711, and if the hash value of the user public key 0 is consistent with that of the manufacturer root public key 5 stored in the BootROM 711, determines that the manufacturer root public key 5 is valid.

Step 902: The BootROM 711 performs signature verification on a user root certificate 2 by using a user root public key 5, and determines that a user public key 1 in the user root certificate 2 is valid.

Step 903: The BootROM 711 verifies a user signature 1 in the L1 boot 720 by using the user public key 1, to obtain a signature verification result 2, where the user signature 1 corresponds to the code segment 1 and the user certificate 1.

Step 904: When the signature verification result 2 represents that software integrity verification on the L1 boot 720 succeeds, load the L1 boot 720.

Step 905: The L1 boot 720 obtains a user public key 2 from the user certificate 1, and verifies the user signature 2 in the L1 boot 730 by using the user public key 2, to obtain a signature verification result 4, where the user signature 2 corresponds to the code segment 2 and the user certificate 2.

Step 906: When the signature verification result 4 represents that software integrity verification on the L1 boot 730 succeeds, load the L1 boot 730.

In this way, the software integrity verification on the boot software package is completed by using a user signature verification mechanism and completely using a key provided by a user, to ensure that software loaded when the second device is booted is secure and trustworthy, thereby providing a reliable environment for the user to use the second device.

Figure 10:
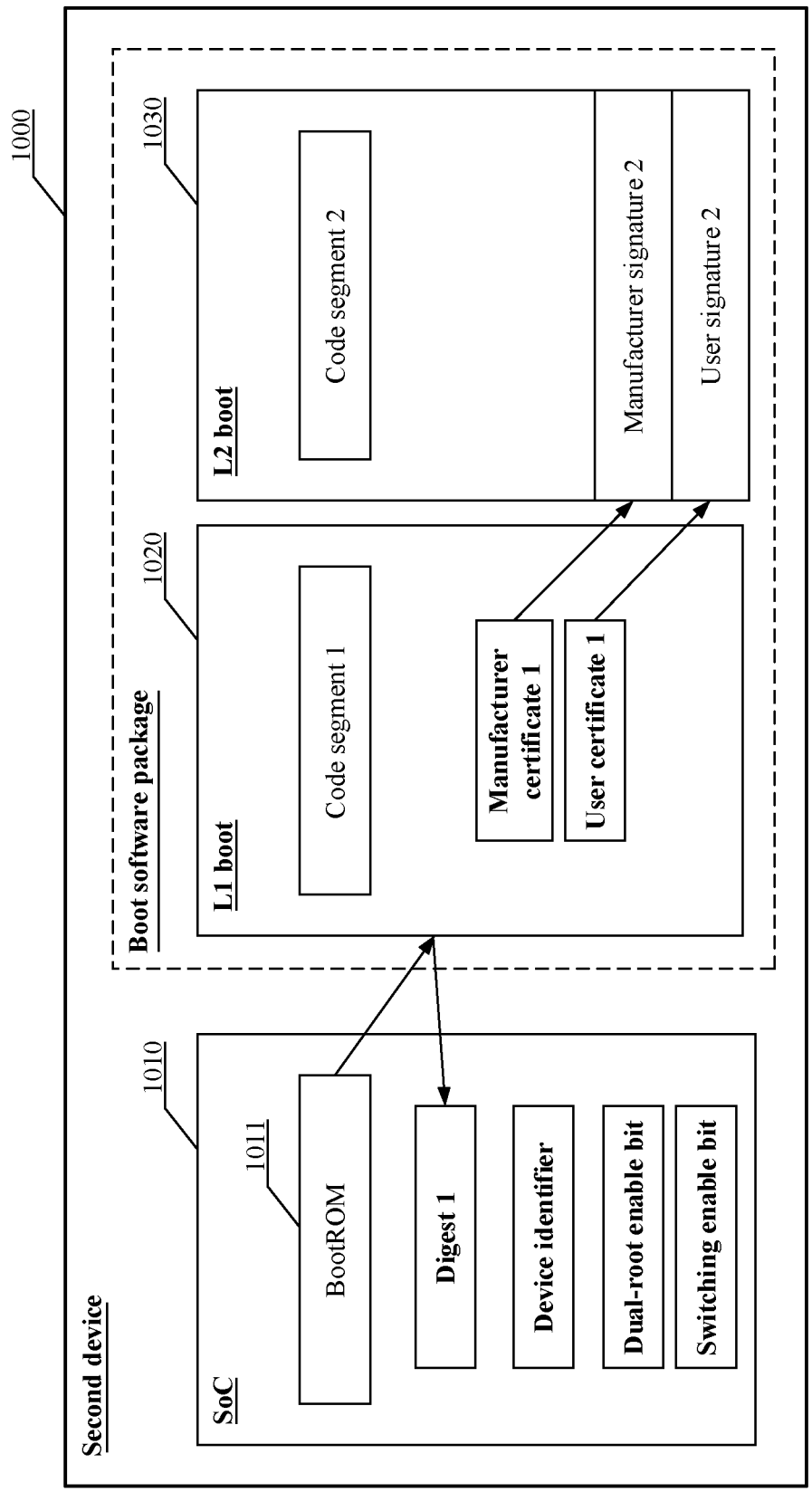
FIG. 10 is a schematic diagram of another scenario for software integrity verification according to an embodiment of this application.

Embodiment 2: A scenario shown in FIG. 10 is used as an example. In the scenario, a second device 1000 includes an SoC 1010 and a boot software package, and the boot software package includes an L1 boot 1020 and an L2 boot 1030. The SoC 1010 includes a BootROM 1011, and stores a digest 1, a device identifier, a value of a dual-root enable bit, and a value of a switching enable bit. The L1 boot 1020 includes a code segment 1, a manufacturer certificate 1, and a user certificate 1. The L2 boot 1030 includes a code segment 2, a manufacturer signature 2, and a user signature 2.

Figure 11:
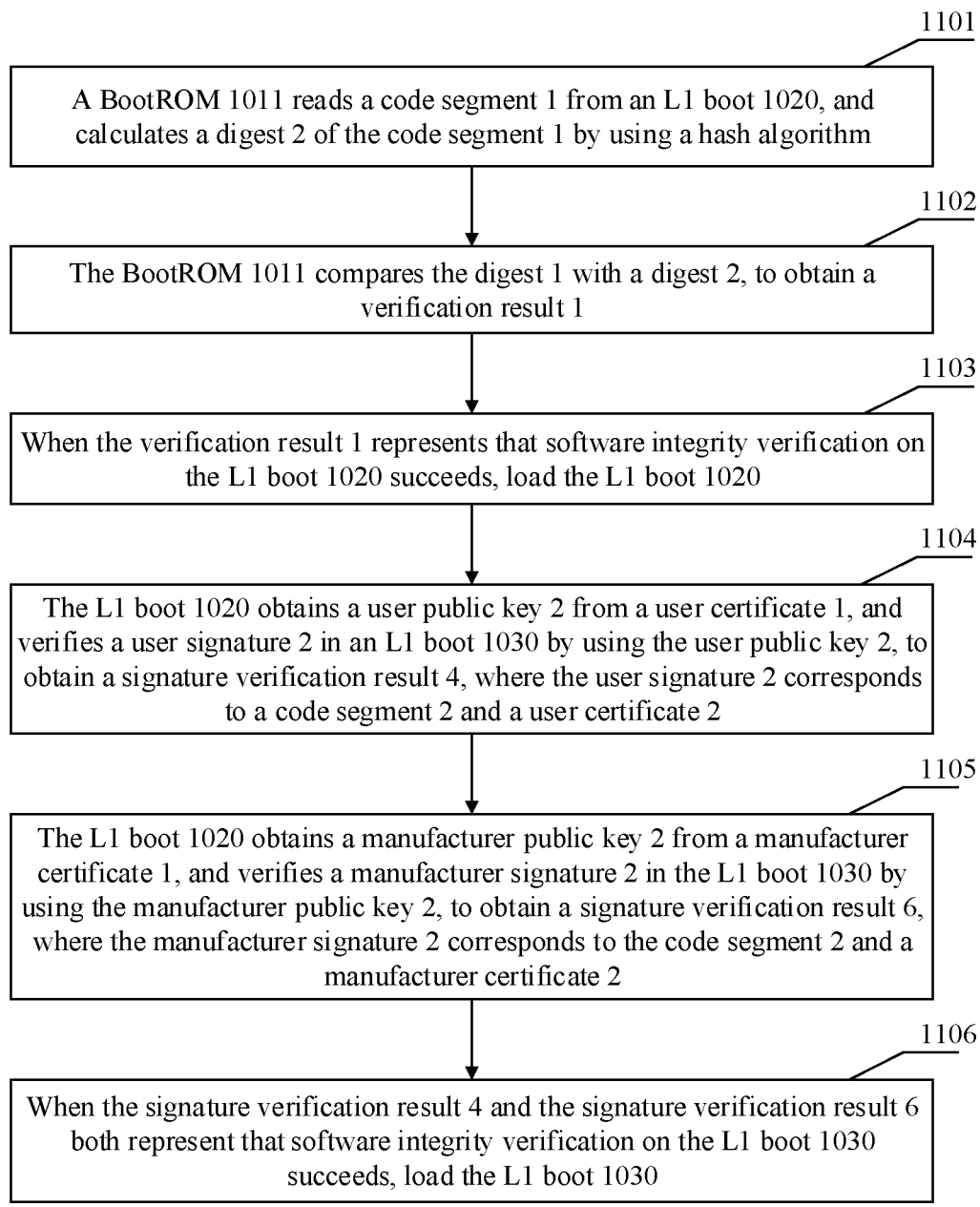
FIG. 11 is a schematic flowchart of another example of software integrity verification according to an embodiment of this application.

During specific implementation, it is assumed that on the second device 1000 shown in FIG. 10, the value of the dual-root enable bit indicates that the dual-root enable bit is valid, the value of the switching enable bit indicates that the switching enable bit is invalid, and the device identifier is included in a dual signature verification device list. If the certificate and the code segment in each boot are uniformly signed, that is, a verification result of the manufacturer signature 2 may represent validity of both the code segment 2 and the manufacturer certificate 2, as shown in FIG. 11, this embodiment of this application specifically includes the following steps.

Step 1101: The BootROM 1011 reads the code segment 1 from the L1 boot 1020, and calculates a digest 2 of the code segment 1 by using a hash algorithm.

Step 1102: The BootROM 1011 compares the digest 1 with the digest 2, to obtain a verification result 1.

It may be understood that, when the digest 1 is consistent with the digest 2, the verification result 1 is used to represent that software integrity verification on the L1 boot 1020 succeeds; or when the digest 1 is not consistent with the digest 2, the verification result 1 is used to represent that software integrity verification on the L1 boot 1020 fails.

Step 1103: When the verification result 1 represents that the software integrity verification on the L1 boot 1020 succeeds, load the L1 boot 1020.

Step 1104: The L1 boot 1020 obtains a user public key 2 from the user certificate 1, and verifies the user signature 2 in the L1 boot 1030 by using the user public key 2, to obtain a signature verification result 4, where the user signature 2 corresponds to the code segment 2 and the user certificate 2.

Step 1105: The L1 boot 1020 obtains a manufacturer public key 2 from the manufacturer certificate 1, and verifies the manufacturer signature 2 in the L1 boot 1030 by using the manufacturer public key 2, to obtain a signature verification result 6, where the manufacturer signature 2 corresponds to the code segment 2 and the manufacturer certificate 2.

Step 1106: When the signature verification result 4 and the signature verification result 6 each represent that the software integrity verification on the L1 boot 1030 succeeds, load the L1 boot 1030.

In this way, only the digest is stored in the SoC, thereby saving hardware storage resources of the second device. In addition, software integrity verification on the boot software package is still completed inside the software package by using a dual signature verification mechanism, to ensure security of software loaded when the second device is booted, thereby providing a reliable environment for a user to use the second device.

Figure 12:
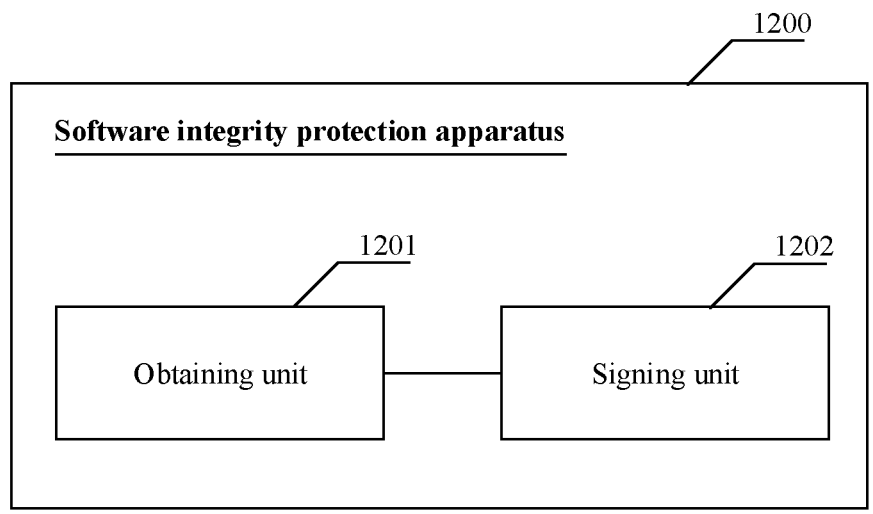
FIG. 12 is a schematic structural diagram of a software integrity protection apparatus according to an embodiment of this application.

Correspondingly, an embodiment of this application further provides a software integrity protection apparatus 1200. As shown in FIG. 12, the apparatus 1200 is used in a first device, and the apparatus 1200 includes an obtaining unit 1201 and a signing unit 1202.

The obtaining unit 1201 is configured to obtain a first software package, where the first software package includes a first signature made by a first party for a second software package by using a first private key. The signing unit 1202 is configured to perform a signing operation on the first software package by using a second private key, to obtain a third software package including a second signature, where the first private key is controlled by the first party, and the second private key is controlled by a second party.

The first party is a user of the second software package, and the second party is a manufacturer of the second software package or a third-party digital certificate authority.

In a possible implementation, the apparatus further includes a sending unit. The sending unit is configured to send a third software package to a second device.

In another possible implementation, when a switching enable bit on the second device is invalid and a dual-root enable bit on the second device is valid, the first signature and the second signature being both valid represent that integrity verification on the second software package succeeds; or when a switching enable bit on the second device is valid, the first signature being valid represents that integrity verification on the second software package succeeds; or when a switching enable bit on the second device is invalid and a dual-root enable bit on the second device is invalid, the second signature being valid represents that integrity verification on the second software package succeeds.

It should be noted that the apparatus 1200 is configured to perform related operations in the embodiment shown in FIG. 2. For specific implementations and achieved effects of the apparatus 1200, refer to related descriptions in the embodiment shown in FIG. 2. Details are not described herein again.

Figure 13:
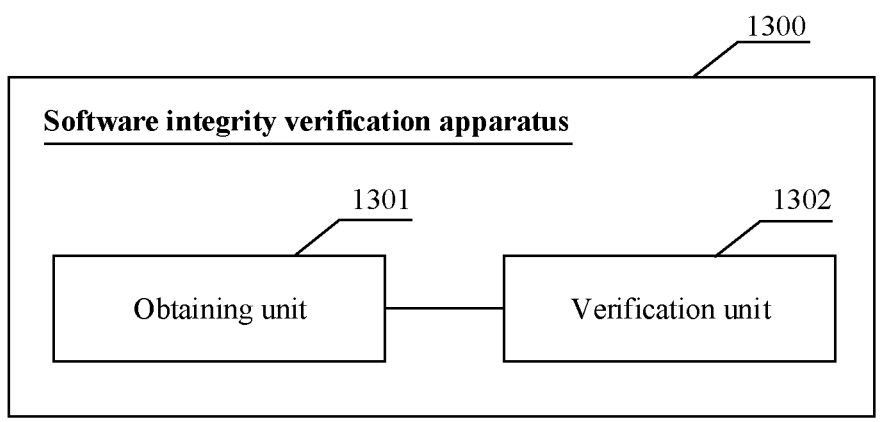
FIG. 13 is a schematic structural diagram of a software integrity verification apparatus according to an embodiment of this application.

In addition, an embodiment of this application further provides a software integrity verification apparatus 1300. As shown in FIG. 13, the apparatus 1300 is used in a second device, and the apparatus 1300 includes an obtaining unit 1301 and a verification unit 1302.

The obtaining unit 1301 is configured to obtain a first software package, where the first software package includes a first signature, a second signature, and a second software package. The verification unit 1302 is configured to verify the first signature and the second signature respectively based on a first public key and a second public key that are prestored, to obtain a verification result, where the first public key is controlled by a first party, and the second public key is controlled by a second party.

In a possible implementation, the first signature is obtained by performing a signing operation on the second software package by using a first private key controlled by the first party, the first signature and the second software package are included in a third software package, the second signature is obtained by performing a signing operation on the third software package by using a second private key controlled by the second party, the first private key matches the first public key, and the second private key matches the second public key.

The first party is a user of the second software package, and the second party is a manufacturer of the second software package or a third-party digital certificate authority.

In another possible implementation, when a switching enable bit on the second device is invalid and a dual-root enable bit on the second device is valid, the verification unit 1302 includes: a first verification subunit, configured to verify the first signature based on the prestored first public key, to obtain a first signature verification result, where the first signature verification result is used to represent whether the first signature is valid; a second verification subunit, configured to verify the second signature based on the prestored second public key, to obtain a second signature verification result, where the second signature verification result is used to represent whether the second signature is valid; and a first generation subunit, configured to generate the verification result based on the first signature verification result and the second signature verification result, where the verification result is used to represent whether software integrity verification on the second software package succeeds, and when the first signature verification result represents that the first signature is valid and the second signature verification result represents that the second signature is valid, the verification result represents that the integrity verification on the second software package succeeds. Alternatively, when a switching enable bit on the second device is valid, the verification unit 1302 includes: a third verification subunit, configured to verify the first signature based on the prestored first public key, to obtain a first signature verification result, where the first signature verification result is used to represent whether the first signature is valid; and a second generation subunit, configured to generate the verification result based on the first signature verification result, where the verification result is used to represent whether software integrity verification on the second software package succeeds, and when the first signature verification result represents that the first signature is valid, the verification result represents that the integrity verification on the second software package succeeds. Alternatively, when a switching enable bit on the second device is invalid and a dual-root enable bit on the first device is invalid, the verification unit 1302 includes: a fourth verification subunit, configured to verify the second signature based on the prestored second public key, to obtain a second signature verification result, where the second signature verification result is used to represent whether the second signature is valid; and a third generation subunit, configured to generate the verification result based on the second signature verification result, where the verification result is used to represent whether software integrity verification on the second software package succeeds, and when the second signature verification result represents that the second signature is valid, the verification result represents that the integrity verification on the second software package succeeds.

It should be noted that the apparatus 1300 is configured to perform related operations in the embodiment shown in FIG. 5. For specific implementations and achieved effects of the apparatus 1300, refer to related descriptions in the embodiment shown in FIG. 5. Details are not described herein again.

Figure 14:
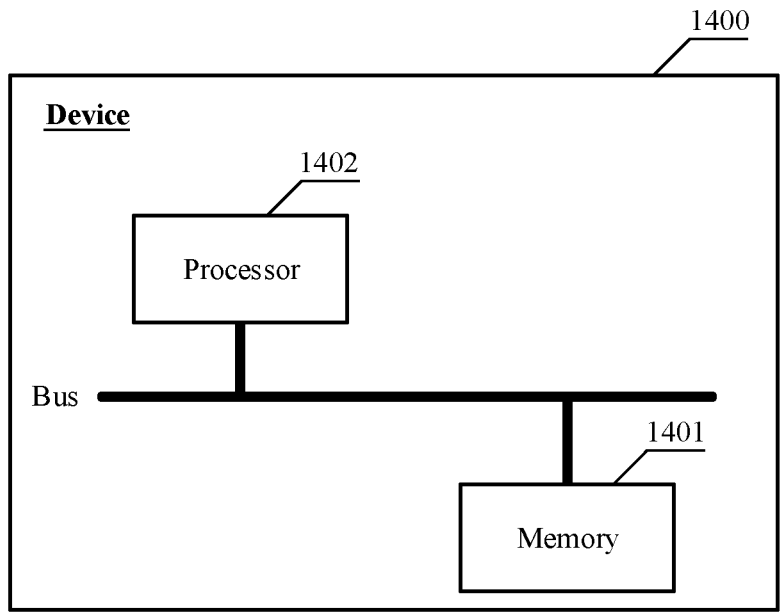
FIG. 14 is a schematic structural diagram of a device according to an embodiment of this application.

In addition, an embodiment of this application further provides a device 1400. As shown in FIG. 14, the device 1400 includes a memory 1401 and a processor 1402. The memory 1401 is configured to store program code. The processor 1402 is configured to run the program code or instructions, to enable the device 1400 to perform the method in any one of the implementations in the foregoing embodiment shown in FIG. 2 or FIG. 5.

In addition, an embodiment of this application further provides a computer-readable storage medium. The computer-readable storage medium stores program code or instructions. When the program code or the instructions are run on a computer, the computer is enabled to perform the method in any one of the implementations in the foregoing embodiment shown in FIG. 2 or FIG. 5.

Figure 15:
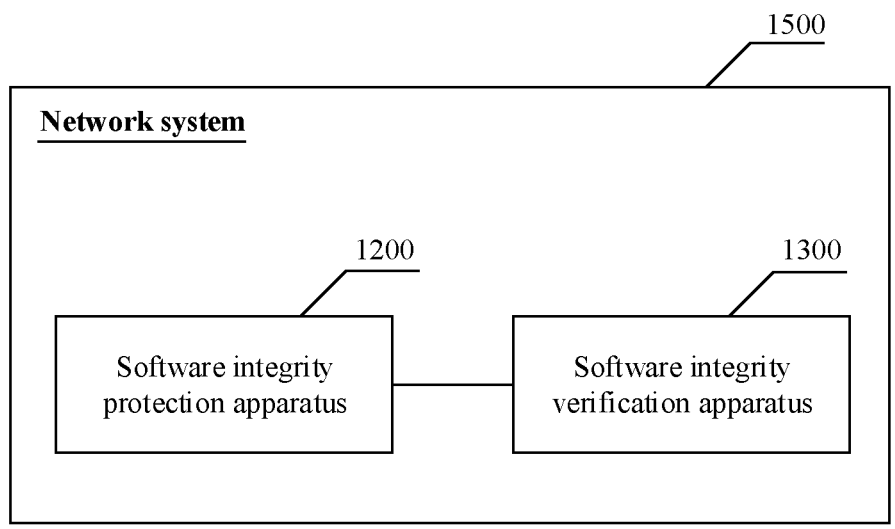
FIG. 15 is a schematic structural diagram of a network system according to an embodiment of this application.

In addition, an embodiment of this application further provides a network system 1500. As shown in FIG. 15, the network system 1500 includes the software integrity protection apparatus 1200 and the software integrity verification apparatus 1300.

"First" in terms such as the "first public key" and the "first private key" mentioned in the embodiments of this application is merely used as a name identifier, but does not represent first in sequence. This rule is also applicable to "second" and the like.

It can be learned from the foregoing descriptions of the implementations that, a person skilled in the art may clearly understand that some or all of the steps in the methods in the foregoing embodiments may be implemented by using software and a universal hardware platform. Based on such an understanding, the technical solutions of this application may be implemented in a form of a software product. The computer software product may be stored in a storage medium, for example, a read-only memory (ROM)/RAM, a magnetic disk, or an optical disc, and include several pieces of program code or several instructions for instructing a computer device (which may be a personal computer, a server, or a network communications device such as a router) to perform the methods described in the embodiments or some parts of the embodiments of this application.

The embodiments in this specification are all described in a progressive manner, for same or similar parts in the embodiments, refer to these embodiments, and each embodiment focuses on a difference from other embodiments. Especially, apparatus and device embodiments are basically similar to the method embodiments, and therefore are described briefly. For related parts, refer to partial descriptions in the method embodiments. The described device and apparatus embodiments are merely examples. The modules described as separate parts may or may not be physically separate, and parts displayed as modules may or may not be physical modules, may be located at one position, or may be distributed on a plurality of network units. Some or all of the modules may be selected based on an actual requirement to achieve the objectives of the solutions of the embodiments. A person of ordinary skill in the art may understand and implement the embodiments without creative efforts.

The foregoing descriptions are merely example implementations of this application, but are not intended to limit the protection scope of this application. It should be noted that a person of ordinary skill in the art may make some improvements and polishing without departing from this application and the improvements and polishing shall fall within the protection scope of this application.

What is claimed is:

1. A software integrity protection method, comprising:
    obtaining, by a first device, a first software package, wherein the first software package comprises a first signature and software, the first signature made by a first party for the software as part of a second software package using a first private key;
    performing, by the first device, a signing operation on at least the software using a second private key, to obtain a third software package comprising a second signature and the software, wherein the first private key is controlled by the first party, and the second private key is controlled by a second party;
    sending, by the first device, the third software package to a second device;
    receiving, by the second device, the third software package; and
    wherein the second device comprises a switching enable bit, and the method further comprises at least one of:
        when the switching enable bit is invalid and a dual-root enable bit on the second device is valid:
            determining, by the second device, that the first signature and the second signature are both valid; and
            indicating, by the second device, that integrity verification on the software succeeds based on the switching enable bit being invalid, the dual-root enable bit being valid, and the first signature and second signature both being valid; or
        when the switching enable bit on the second device is valid:
            determining, by the second device, that the first signature is valid; and
            indicating, by the second device, that integrity verification on the software succeeds based a on the switching enable bit being valid and the first signature being valid; or
        when the switching enable bit is invalid and the dual-root enable bit on the second device is invalid:

determining, by the second device, that the second signature is valid; and indicating, by the second device, that integrity verification on the software succeeds based on the switching enable bit being invalid, the dual-root enable bit being invalid, and the second signature being valid.

2. The method according to claim 1, wherein the first party is a user of the software, and the second party is a manufacturer of the software or a third-party digital certificate authority.

3. A software integrity verification method, comprising:
obtaining, by a second device, a first software package, wherein the first software package comprises a first signature, a second signature, and a second software package comprising software; and verifying integrity of the software, by the second device, by verifying at least one of the first signature and the second signature respectively based on a first public key and a second public key that are prestored, to obtain a verification result, wherein the first public key is controlled by a first party, and the second public key is controlled by a second party, wherein the second device comprises a switching enable bit, and the verifying integrity of the software comprising at least one of:

when the switching enable bit is invalid and a dual-root enable bit on the second device is valid:
determining, by the second device, that the first signature and the second signature are both valid; and indicating, by the second device, that integrity verification on the second software package succeeds based on the switching enable bit being invalid, the dual-root enable bit being valid, and the first signature and second signature both being valid; or when the switching enable bit on the second device is valid:
determining, by the second device, that the first signature is valid; and indicating, by the second device, that integrity verification on the second software package succeeds based a on the switching enable bit being valid and the first signature being valid; or when the switching enable bit is invalid and the dual-root enable bit on the second device is invalid:
determining, by the second device, that the second signature is valid; and indicating, by the second device, that integrity verification on the second software package succeeds based on the switching enable bit being invalid, the dual-root enable bit being invalid, and the second signature being valid.

4. The method according to claim 3, wherein the first signature is generated by performing a signing operation on the second software package by using a first private key controlled by the first party, the first signature and the second software package are comprised in a third software package, the second signature is obtained by performing a signing operation on the third software package by using a second private key controlled by the second party, the first private key matches the first public key, and the second private key matches the second public key.

5. The method according to claim 3, wherein the first party is a user of the second software package, and the second party is a manufacturer of the second software package or a third-party digital certificate authority.

6. A software integrity protection system, comprising:
a first device, comprising at least one processor and a memory coupled with the one or more processors, wherein the memory comprises instructions that, when executed by the at least one processor, cause the first device to:
obtain a first software package, wherein the first software package comprises a first signature, the first signature and software made by a first party for the software as a part of a second software package using a first private key;

perform a signing operation on at least the software using a second private key, to obtain a third software package comprising a second signature and the software, wherein the first private key is controlled by the first party, and the second private key is controlled by a second party; and send the third software package; and a second device, comprising at least one second processor and a second memory coupled with the one or more second processors, the second memory comprising second instructions, the second instructions when executed by the at least one second processor cause the second device to:
receive the third software package;
wherein the second device comprises a switching enable bit, and the second instructions when executed by the at least one second processor cause the second device further to:
when the switching enable bit is invalid and a dual-root enable bit on the second device is valid:
determine that the first signature and the second signature are both valid; and indicate that integrity verification on the software succeeds based on the switching enable bit being invalid, the dual-root enable bit being valid, and the first signature and second signature both being valid; or when the switching enable bit on the second device is valid:
determine that the first signature is valid; and indicate that integrity verification on the software succeeds based a on the switching enable bit being valid and the first signature being valid; or when the switching enable bit is invalid and the dual-root enable bit on the second device is invalid:
determine that the second signature is valid; and indicate that integrity verification on the software succeeds based on the switching enable bit being invalid, the dual-root enable bit being invalid, and the second signature being valid.

7. The system according to claim 6, wherein the first party is a user of the second software package, and the second party is a manufacturer of the second software package or a third-party digital certificate authority.

8. A software integrity verification device, where the software integrity verification device comprising:
at least one processor and a memory coupled with the one or more processors, the memory comprising instructions, the instructions when executed by the at least one processor cause the device to:

obtain a first software package, wherein the first software package comprises a first signature, a second signature, and a second software package comprising software; and verify integrity of the first software package by verifying at least one of the first signature and the second signature respectively based on a first public key and a second public key that are prestored, to obtain a verification result, wherein the first public key is controlled by a first party, and the second public key is controlled by a second party, wherein the software integrity verification device comprises a switching enable bit, and the verifying integrity of the software comprising at least one of:
- when the switching enable bit is invalid and a dual-root enable bit on the software integrity verification device is valid:
  - determining that the first signature and the second signature are both valid; and
  - indicating that integrity verification on the second software package succeeds based on the switching enable bit being invalid, the dual-root enable bit being valid, and the first signature and second signature both being valid; or
- when the switching enable bit on the software integrity verification device is valid:
  - determining that the first signature is valid; and
  - indicating that integrity verification on the second software package succeeds based a on the switching enable bit being valid and the first signature being valid; or
- when the switching enable bit is invalid and the dual-root enable bit on the software integrity verification device is invalid:
  - determining that the second signature is valid; and
  - indicating that integrity verification on the second software package succeeds based on the switching enable bit being invalid, the dual-root enable bit being invalid, and the second signature being valid.

9. The device according to claim 8, wherein the first signature is generated by performing a signing operation on the second software package by using a first private key controlled by the first party, the first signature and the second software package are comprised in a third software package, the second signature is obtained by performing a signing operation on the third software package by using a second private key controlled by the second party, the first private key matches the first public key, and the second private key matches the second public key.

10. The device according to claim 8, wherein the first party is a user of the second software package, and the second party is a manufacturer of the second software package or a third-party digital certificate authority.

* * * * *